(12) United States Patent
Ma et al.

(10) Patent No.: US 12,063,116 B2
(45) Date of Patent: Aug. 13, 2024

(54) COMMUNICATION METHOD, APPARATUS, DEVICE, SYSTEM, AND STORAGE MEDIUM

(71) Applicant: HUAWEI TECHNOLOGIES CO., LTD., Shenzhen (CN)

(72) Inventors: Ruixiang Ma, Beijing (CN); Shengyu Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 542 days.

(21) Appl. No.: 17/325,330

(22) Filed: May 20, 2021

(65) Prior Publication Data

US 2021/0273750 A1 Sep. 2, 2021

Related U.S. Application Data

(63) Continuation of application No. PCT/CN2019/114568, filed on Oct. 31, 2019.

(30) Foreign Application Priority Data

Nov. 23, 2018 (CN) .......................... 201811410218.9

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1854* (2013.01); *H04L 1/1887* (2013.01); *H04W 72/23* (2023.01)

(58) Field of Classification Search
CPC ... H04L 1/1812; H04L 1/1854; H04L 1/1887; H04W 72/23
See application file for complete search history.

(56) References Cited

U.S. PATENT DOCUMENTS 10,484,143 B2 11/2019 Zhang
2017/0214511 A1 7/2017 Li et al.
(Continued)

FOREIGN PATENT DOCUMENTS

CN 103220102 A 7/2013
CN 107154837 A 9/2017
(Continued)

OTHER PUBLICATIONS

3GPP TSG RAN WG1 Meeting #87,R1-1612124, Considerations on interference management in NR, MediaTek Inc., Reno, USA, Nov. 14-18, 2016, total 7 pages.

*Primary Examiner* — Elton Williams
(74) *Attorney, Agent, or Firm* — Rimon PC

(57) ABSTRACT

This application discloses that a terminal device determines at least one target time parameter set based on N time parameter sets, where time unit lengths corresponding to at least two of the N time parameter sets are different; determines M target times based on a first time and the at least one target time parameter set, generates a codebook based on response information corresponding to downlink information received at at least one of the M target times, and sends the codebook to a network device at the first time. Correspondingly, the network device determines, based on the response information included in the codebook, whether the downlink information corresponding to the response information is successfully transmitted. Therefore, when the time unit lengths corresponding to the at least two of the N time parameter sets are different, the network device and the terminal device have a consistent understanding of the codebook.

20 Claims, 15 Drawing Sheets

(51) Int. Cl.
*H04L 1/1867* (2023.01)
*H04W 72/23* (2023.01)

(56) References Cited

U.S. PATENT DOCUMENTS

2018/0027590 A1* 1/2018 Yerramalli ............ H04W 16/14
                                                        370/328
2018/0359068 A1* 12/2018 Kim ...................... H04L 1/0072
2019/0306878 A1* 10/2019 Zhang ................... H04W 72/23

FOREIGN PATENT DOCUMENTS

| CN | 107370534 | A  | 11/2017 |
| CN | 108173627 | A  | 6/2018  |
| CN | 108289015 | A  | 7/2018  |
| CN | 108347309 | A  | 7/2018  |
| CN | 108702747 | A  | 10/2018 |
| CN | 108737034 | A  | 11/2018 |
| EP | 3531605   | A1 | 8/2019  |
| EP | 3566378   | A1 | 11/2019 |
| WO | 2010140131| A2 | 12/2010 |
| WO | 2017148381| A1 | 9/2017  |
| WO | 2017166249| A1 | 10/2017 |
| WO | 2018082506| A1 | 5/2018  |

* cited by examiner

Target time parameter set = {0, 1, 2, 3}, and a granularity is 1/2 slot

Target time parameter set = {0, 1, 2, 3, 4, 5, 6, 7, 8}, and a granularity is 1/2 slot Target time parameter set = {0, 1, 2, 3}, and a granularity is 1/2 slot Target time parameter set = {0, 1, 2, 3, 4, 5, 6, 7, 8}, and a granularity is 1/2 slot Target time parameter set = {0, 1, 2, 3}, and a granularity is slot Target time parameter set = {0, 1, 2, 3}, and a granularity is slot Time parameter set 1: {1,2,3,4}, and a granularity is slot
Time parameter set 2: {0,1,2,3}, and a granularity is 1/2 slot

COMMUNICATION METHOD, APPARATUS, DEVICE, SYSTEM, AND STORAGE MEDIUM

CROSS-REFERENCE TO RELATED APPLICATIONS

This application is a continuation of International Patent Application No. PCT/CN2019/114568, filed on Oct. 31, 2019, which claims priority to Chinese Patent Application No. 201811410218.9, filed on Nov. 23, 2018. The disclosures of the aforementioned applications are hereby incorporated by reference in their entireties.

TECHNICAL FIELD

This application relates to the field of communications technologies, and in particular, to a communication method, an apparatus, a device, a system, and a storage medium.

BACKGROUND

In a communication process, after receiving downlink data carried in a physical downlink shared channel (PDSCH), a terminal device feeds back a response information to a network device by using a hybrid automatic repeat request (HARQ) based on a data decoding result. To be specific, if data reception succeeds, terminal device feeds back an Acknowledgement (ACK); if data reception fails, the terminal device feeds back a No Acknowledgement (NACK). A timing relationship is met between receiving the downlink data by the terminal device and feeding back the ACK/NACK to the network device by the terminal device.

As a requirement for a delay becomes higher, a feedback delay needs to be reduced. To be specific, the terminal device can feed back a corresponding ACK/NACK as soon as possible after receiving data. Therefore, it is proposed that a time unit length corresponding to feedback information needs to be reduced. For example, a unit of the time unit of the feedback information is changed to ½ slot. Alternatively, a symbol is used as the unit.

However, to ensure backward compatibility, time units corresponding to some feedback information still use a slot as the unit. Therefore, time unit lengths corresponding to the feedback information are not completely the same. In this case, a HARQ_ACK codebook cannot be generated.

SUMMARY

Embodiments of this application provide a communication method, an apparatus, a device, a system, and a storage medium, so that a terminal device can effectively generate a codebook when time unit lengths corresponding to time parameter sets are different.

According to a first aspect, an embodiment of this application provides a communication method. The communication method includes: A terminal device determines at least one target time parameter set based on N time parameter sets, and sends a codebook at a first time, where the codebook includes response information corresponding to downlink information received at at least one of M target times, the M target times are determined based on the first time and the at least one target time parameter set, time unit lengths corresponding to at least two of the N time parameter sets are different, each time parameter set includes at least one time parameter, and the time parameter is used to indicate a quantity of time units between receiving first downlink information by the terminal device and feeding back first response information corresponding to the first downlink information to a network device, where M is a positive integer, and N is a positive integer greater than or equal to 2. It is further realized that, when the time unit lengths corresponding to the at least two of the N time parameter sets are different, the terminal device can effectively generate the codebook, and the network device can effectively parse the codebook. In this way, it is ensured that the network device and the terminal device have a consistent understanding of the codebook, thereby ensuring communication effectiveness and improving resource utilization.

Optionally, each of the N time parameter sets corresponds to a downlink control information (DCI) format, and DCI formats corresponding to at least two of the N time parameter sets are different. Based on this, that the terminal device determines the at least one target time parameter set based on the N time parameter sets may include the following manners.

Manner 1: The terminal device determines one of the N time parameter sets as the target time parameter set. For example, the terminal device uses, as the target time parameter set, a time parameter set predefined in the N time parameter sets that corresponds to a time unit length of a predefined value and/or a predefined DCI format.

Manner 2: The terminal device uses, as the target time parameter set, a time parameter set that is an intersection set or a union set of the N time parameter sets. Optionally, the terminal device converts a time unit length corresponding to each of the N time parameter sets into a target time unit length, to obtain N converted time parameter sets; and obtains an intersection set or a union set of the N converted time parameter sets, to obtain a combined time parameter set, and uses the combined time parameter set as the target time parameter set. Optionally, the target time unit length may be a greatest common divisor of time unit lengths corresponding to the N time parameter sets.

Manner 3: The terminal device obtains an intersection set or a union set of time parameter sets that are in the N time parameter sets and that correspond to a same DCI format, to obtain at least two combined time parameter sets. Optionally, the terminal device converts a time unit length corresponding to each of at least one time parameter set that is in the N time parameter sets and that corresponds to a same DCI format into a target time unit length, to obtain at least one converted time parameter set corresponding to each DCI format, and obtains an intersection set or a union set of the at least one converted time parameter set corresponding to each DCI format, to obtain a combined time parameter set corresponding to each DCI format, and further to obtain the at least two combined time parameter sets. Optionally, the target time unit length may be a greatest common divisor of time unit lengths corresponding to the at least one time parameter set corresponding to the same DCI format.

Then, the terminal device uses one of the obtained at least two combined time parameter sets as the target time parameter set. Optionally, the terminal device uses, as the target time parameter set, a time parameter set predefined in the at least two combined time parameter sets that corresponds to a time unit length of a predefined value and/or a predefined DCI format.

Manner 4: The terminal device uses each of the N time parameter sets as the target time parameter set, to obtain N target time parameter sets.

In this case, that the terminal device determines the M target times based on the first time and the target time parameter set may include: The terminal device determines a time set corresponding to each target time parameter set based on the first time and each of the N target time parameter sets, to obtain N time sets; and obtains an intersection set or a union set of the N time sets, to obtain the M target times.

According to the communication method provided in this embodiment of this application, the terminal device can determine the target time parameter set in the foregoing plurality of manners, thereby enriching manners in which the terminal device determines the at least one target time parameter set based on the N time parameter sets, and meeting a plurality of different application scenarios.

Optionally, the terminal device may obtain the N time parameter sets in the following manner. For example, the terminal device receives first configuration information sent by the network device, and obtains the N time parameter sets based on the first configuration information, where the first configuration information is used to indicate the N time parameter sets. Alternatively, the terminal device receives second configuration information sent by the network device, and obtains the N time parameter sets based on N1 time parameter sets and N2 time parameter sets, where the second configuration information is used to indicate the N1 time parameter sets, the N2 time parameter sets are predefined, the N time parameter sets include the N1 time parameter sets and the N2 time parameter sets, a sum of N1 and N2 is N, and N1 and N2 are both positive integers. In this way, the terminal device can obtain, based on the first configuration information or the second configuration information sent by the network device, the N time parameter sets that are the same as those of the network device, thereby ensuring consistency of the N time parameter sets between the network device and the terminal device.

Optionally, that the terminal device determines the first time for sending the codebook may be that the terminal device receives second downlink information sent by the network device, and the terminal device may determine the first time based on the second downlink information, where the second downlink information is used to indicate the first time.

According to a second aspect, an embodiment of this application provides a communication method. The communication method includes: A network device receives a codebook from a terminal device at a first time, where the codebook includes response information corresponding to downlink information received at at least one of M target times, M is a positive integer, the M target times are determined by the network device based on the first time and at least one target time parameter set, the at least one target time parameter set is determined by the network device based on N time parameter sets, N is a positive integer greater than or equal to 2, time unit lengths corresponding to at least two of the N time parameter sets are different, each time parameter set includes at least one time parameter, and the time parameter is used to indicate a quantity of time units between sending first downlink information by the network device and receiving first response information corresponding to the first downlink information from the terminal device. It is further realized that, when the time unit lengths corresponding to the at least two of the N time parameter sets are different, the network device can effectively parse the codebook. In this way, it is ensured that the network device and the terminal device have a consistent understanding of the codebook, so that the network device can determine whether the downlink information corresponding to the response information is successfully transmitted, thereby ensuring communication effectiveness and improving resource utilization.

Optionally, each of the N time parameter sets corresponds to a DCI format, and DCI formats corresponding to at least two of the N time parameter sets are different.

Optionally, the at least one target time parameter set is one of the N time parameter sets. For example, the target time parameter set is a time parameter set predefined in the N time parameter sets that corresponds to a time unit length of a predefined value and/or a predefined DCI format.

Optionally, the at least one target time parameter set is a time parameter set that is an intersection set or a union set of the N time parameter sets. Optionally, the at least one target time parameter set is a time parameter set obtained by converting a time unit length corresponding to each of the N time parameter sets into a target time unit length, to obtain N converted time parameter sets, and obtaining an intersection set or a union set of the N converted time parameter sets. Optionally, the target time unit length may be a greatest common divisor of time unit lengths corresponding to the N time parameter sets.

Optionally, the at least one target time parameter set is one of at least two combined time parameter sets that is an intersection set or a union set of time parameter sets that are in the N time parameter sets and that correspond to a same DCI format. Optionally, the terminal device converts a time unit length corresponding to each of at least one time parameter set that is in the N time parameter sets and that corresponds to a same DCI format into a target time unit length, to obtain at least one converted time parameter set corresponding to each DCI format, obtains an intersection set or a union set of the at least one converted time parameter set corresponding to each DCI format, to obtain a combined time parameter set corresponding to each DCI format, and further to obtain the at least two combined time parameter sets, and uses one of the at least two combined time parameter sets as the target time parameter set. Optionally, the target time unit length may be a greatest common divisor of time unit lengths corresponding to the at least one time parameter set corresponding to the same DCI format.

Optionally, the at least one target time parameter set is N target time parameter sets, and each of the N target time parameter sets is each of the N time parameter sets; and correspondingly, the M target times are an intersection set or a union set of N time sets, and the N time sets are determined based on the first time and each of the N target time parameter sets.

It should be noted that a method used by the network device to determine the at least one target time parameter set based on the N time parameter sets is the same as that used by the terminal device, thereby ensuring that the network device and the terminal device have a consistent understanding of the codebook.

Optionally, the network device further determines N time parameter sets and sends first configuration information to the terminal device, so that the terminal device obtains the N time parameter sets based on the first configuration information, thereby ensuring consistency of the N time parameter sets between the network device and the terminal device, where the first configuration information is used to indicate the N time parameter sets.

Alternatively, the network device determines the N time parameter sets, and sends second configuration information to the terminal device, so that the terminal device obtains the N time parameter sets based on the first configuration information, thereby ensuring consistency of the N time parameter sets between the network device and the terminal device, where the second configuration information is used to indicate N1 time parameter sets, the N time parameter sets include the N1 time parameter sets and N2 time parameter sets, the N2 time parameter sets are predefined, a sum of N1 and N2 is N, and N1 and N2 are both positive integers.

Optionally, before receiving the codebook at the first time, the network device further sends second downlink information to the terminal device, so that the terminal device determines the first time based on the second downlink information, thereby ensuring consistency of the first time between the network device and the terminal device, where the second downlink information is used to indicate the first time.

According to a third aspect, an embodiment of this application provides a communications apparatus. The communications apparatus may be a terminal device, or may be a component (for example, an integrated circuit or a chip) of a terminal device. The communications apparatus may implement functions corresponding to steps in the method in the first aspect. The functions may be implemented by hardware, or may alternatively be implemented by hardware executing corresponding software. The hardware or the software includes one or more units or modules corresponding to the foregoing functions.

In a possible design, the apparatus includes a processor. The processor is configured to support the apparatus in executing the corresponding functions in the method in the foregoing first aspect. The apparatus may further include a memory. The memory is configured to be coupled to the processor, and stores program instructions and data that are necessary for the apparatus. Optionally, the apparatus further includes a transceiver. The transceiver is configured to support communication between the apparatus and another network element. The transceiver may be an independent receiver, an independent transmitter, or a transceiver integrated with receiving and sending functions.

In a possible design, the communications apparatus includes a processing unit and a transceiver unit. The processing unit is configured to determine at least one target time parameter set based on N time parameter sets, where N is a positive integer greater than or equal to 2, time unit lengths corresponding to at least two of the N time parameter sets are different, each time parameter set includes at least one time parameter, and the time parameter is used to indicate a quantity of time units between receiving first downlink information and feeding back first response information corresponding to the first downlink information. The transceiver unit is configured to send a codebook at a first time, where the codebook includes response information corresponding to downlink information received at at least one of M target times, the M target times are determined based on the first time and the at least one target time parameter set, and M is a positive integer.

According to a fourth aspect, an embodiment of this application provides a communications apparatus. The communications apparatus may be a network device, or may be a component (for example, an integrated circuit or a chip) of a network device. The communications apparatus may implement functions corresponding to steps in the method in the second aspect. The functions may be implemented by hardware, or may alternatively be implemented by hardware executing corresponding software. The hardware or the software includes one or more units or modules corresponding to the foregoing functions.

In a possible design, the apparatus includes a processor. The processor is configured to support the apparatus in executing the corresponding functions in the method in the foregoing second aspect. The apparatus may further include a memory. The memory is configured to be coupled to the processor, and stores program instructions and data that are necessary for the apparatus. Optionally, the apparatus further includes a transceiver. The transceiver is configured to support communication between the apparatus and another network element. The transceiver may be an independent receiver, an independent transmitter, or a transceiver integrated with receiving and sending functions.

In a possible design, the communications device includes a transceiver unit. The transceiver unit is configured to receive a codebook at a first time, where the codebook includes response information corresponding to downlink information received at at least one of M target times, M is a positive integer, the M target times are determined based on the first time and at least one target time parameter set, the at least one target time parameter set is determined based on N time parameter sets, N is a positive integer greater than or equal to 2, time unit lengths corresponding to at least two of the N time parameter sets are different, each time parameter set includes at least one time parameter, and the time parameter is used to indicate a quantity of time units between sending first downlink information and receiving first response information corresponding to the first downlink information by the transceiver unit.

According to a fifth aspect, an embodiment of this application provides a communications device. The communications device includes a processor and a transceiver. The processor and the transceiver are configured to perform the communication method according to either of the first aspect and the second aspect.

According to a sixth aspect, an embodiment of this application provides an apparatus. The apparatus exists in a product form of a chip. A structure of the apparatus includes a processor and a memory. The memory is configured to: be coupled to the processor, and store program instructions and data that are necessary for the apparatus. The processor is configured to execute the program instructions stored in the memory, so that the apparatus performs functions of the terminal device in the foregoing methods.

According to a seventh aspect, an embodiment of this application provides an apparatus. The apparatus exists in a product form of a chip. A structure of the apparatus includes a processor and a memory. The memory is configured to: be coupled to the processor, and store program instructions and data that are necessary for the apparatus. The processor is configured to execute the program instructions stored in the memory, so that the apparatus performs functions of the network device in the foregoing methods.

According to an eighth aspect, an embodiment of this application provides a computer storage medium. The storage medium includes computer instructions. When the instructions are executed by a computer, the computer is enabled to implement the communication method according to either of the first aspect and the second aspect.

According to a ninth aspect, an embodiment of this application provides a computer program product, where the program product includes a computer program, the computer program is stored in a readable storage medium, at least one processor of a communications apparatus can read the computer program from the readable storage medium, and the at least one processor executes the computer program, so that the communications apparatus performs the communication method according to either of the first aspect and the second aspect.

According to a tenth aspect, an embodiment of this application provides a communications system, where the system includes the foregoing terminal device and network device.

According to the communication method, the apparatus, the device, the system, and the storage medium provided in the embodiments of this application, the terminal device determines the at least one target time parameter set based on the N time parameter sets, where the time unit lengths corresponding to the at least two of the N time parameter sets are different. Each time parameter set includes the at least one time parameter, and the time parameter is used to indicate the quantity of time units between receiving the first downlink information by the terminal device and feeding back, by the terminal device to the network device, the first response information corresponding to the first downlink information. Then, the terminal device determines the M target times based on the first time and the at least one target time parameter set, generates the codebook based on the response information corresponding to the downlink information received at at least one of the M target times, and then sends the codebook to the network device at the first time. After receiving the codebook, the network device parses the codebook, and determines, based on the response information included in the codebook, whether the downlink information corresponding to the response information is successfully transmitted. In other words, according to the embodiments of this application, when the time unit lengths corresponding to the at least two of the N time parameter sets are different, the terminal device can effectively generate the codebook, and the network device can effectively parse the codebook. In this way, it is ensured that the network device and the terminal device have a consistent understanding of the codebook, thereby ensuring communication effectiveness and improving resource utilization.

DESCRIPTION OF EMBODIMENTS

Figure 1:
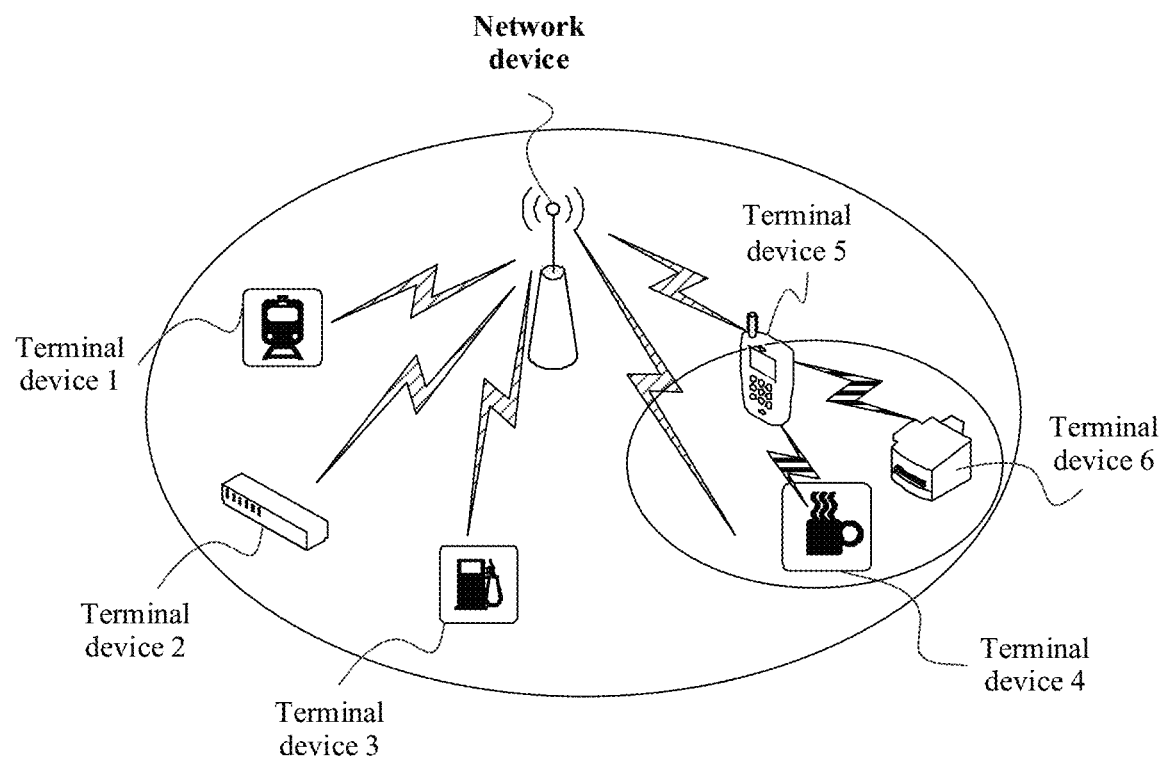
FIG. 1 is a schematic diagram of a communications system according to an embodiment of this application.

The following describes technical solutions in embodiments of this application with reference to the accompanying drawings in the embodiments of this application.

To facilitate understanding of the embodiments of this application, related concepts in the embodiments of this application are first briefly described as follows:

In the embodiments of this application, higher layer signaling may be signaling sent by a higher-layer protocol layer. The higher-layer protocol layer is at least one protocol layer above a physical layer. The higher-layer protocol layer may specifically include at least one of the following protocol layers: a media access control (MAC) layer, a radio link control (RLC) layer, a packet data convergence protocol (PDCP) layer, a radio resource control (RRC) layer, and a non-access stratum (NAS).

In the embodiments of this application, a codebook is a codebook, for example, a HARQ-ACK codebook, generated based on response information corresponding to downlink information. The response information may be a reception success message ACK or a reception failure message NACK. The downlink information may be a physical downlink shared channel (PDSCH) carrying downlink data, or a physical downlink control channel (PDCCH), or a downlink control channel (PDCCH) for deactivating a PDSCH in semi-persistent scheduling (SPS).

In the embodiments of this application, indication information sent by a network device may be carried in DCI, or may be carried in higher layer signaling.

In the embodiments of this application, a time unit is a segment of time domain resource used to carry information. For example, one time unit may include one or more consecutive transmission time intervals (TTI), one or more slots, one or more time domain symbols, or one or more mini-slots. One slot includes 14 time domain symbols, or one slot includes 12 time domain symbols. A quantity of time domain symbols included in one mini-slot is less than a quantity of symbols included in one slot. Different time units are used to carry different data packets or different duplicates (or referred to as duplicate copies) of a same data packet.

Resources described in the embodiments of this application are transmission resources, including a time domain resource and a frequency domain resource, and may be used to carry data or signaling during uplink communication or downlink communication.

Unless otherwise specified, "transmit/transmission" in the embodiments of this application refers to bidirectional transmission, and includes a sending action and/or a receiving action. Specifically, "transmit/transmission" in the embodiments of this application includes data sending, data receiving, or data sending and data receiving. In other words, data transmission herein includes uplink and/or downlink data transmission. The data may include a channel and/or a signal. The uplink data transmission is uplink channel transmission and/or uplink signal transmission, and the downlink data transmission is downlink channel transmission and/or downlink signal transmission.

A service in the embodiments of this application is a communications service obtained by a terminal device from a network side. The communications service includes a control plane service and/or a data plane service, for example, a voice service and a data traffic service. Sending or receiving of the service includes sending or receiving of service-related data or signaling.

It should be understood that in the embodiments of this application, "B corresponding to A" indicates that B is associated with A. In a possible implementation, B may be determined based on A. However, it should be further understood that determining B based on A does not mean that B is determined based on only A. B may alternatively be determined based on A and/or other information.

In description of this application, the term "a plurality of" means two or more than two unless otherwise specified.

In addition, for convenience of clear description of the technical solutions in the embodiments of this application, in the embodiments of this application, terms such as "first", "second", and the like are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference.

FIG. 1 is a schematic diagram of a communications system according to an embodiment of this application. As shown in FIG. 1, the communications system includes a network device and a terminal device.

The network device is a device in a wireless network, for example, a radio access network (RAN) node that connects a terminal to the wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or the like. In a network structure, the network device may include a centralized unit (CU) node, a distributed unit (DU) node, or a RAN device including a CU node and a DU node. This is not limited herein.

The terminal device may be a wireless terminal device or a wired terminal device. The wireless terminal device may be a device having a wireless transceiver function, and may be deployed on land, including an indoor or outdoor device, a handheld device, or a vehicle-mounted device; or may be deployed on a water surface (for example, on a steamboat); or may be deployed in the air (for example, on an airplane, a balloon, or a satellite). The terminal device may be a mobile phone, a tablet, a computer having a wireless transceiver function, a virtual reality (VR) terminal device, an augmented reality (AR) terminal device, a wireless terminal device in industrial control, a wireless terminal device in self driving, a wireless terminal device in telemedicine, a wireless terminal device in a smart grid, a wireless terminal device in transportation safety, a wireless terminal device in a smart city, a wireless terminal device in a smart home, or the like. This is not limited herein. It may be understood that, in the embodiments of this application, the terminal device may also be referred to as user equipment (UE).

The communications system shown in FIG. 1 may be a 2G, 3G, 4G, or 5G communications system, or a next generation communications system, for example, a global system for mobile communications (GSM), a code division multiple access (CDMA) system, a time division multiple access (TDMA) system, or a wideband code division multiple access (WCDMA) system, a frequency division multiple access (FDMA) system, an orthogonal frequency division multiple access (OFDMA) system, a single-carrier FDMA (SC-FDMA) system, a general packet radio service (GPRS) system, a long term evolution (LTE) system, and a new radio (NR) communications system.

In the embodiments of this application, the network device and the terminal device may communicate with each other by using a licensed spectrum, or may communicate with each other by using an unlicensed spectrum, or may communicate with each other by using both a licensed spectrum and an unlicensed spectrum. The network device and the terminal device may communicate with each other by using a spectrum below 6 GHz, or may communicate with each other by using a spectrum above 6 GHz, or may communicate with each other by using both a spectrum below 6 GHz and a spectrum above 6 GHz. The spectrum resource used between the network device and the terminal device is not limited in the embodiments of this application.

As shown in FIG. 1, a terminal device and a network device may perform service transmission. A service in the embodiments of this application may include but is not limited to an enhanced mobile broadband (eMBB) service, an ultra-reliable and low-latency communication (URLLC) service, a massive machine-type communications (mMTC) service, and the like. Typical URLLC services include: wireless control in an industrial manufacturing or production process, motion control of an unmanned vehicle and a UAV, and tactile interactive applications such as remote repair and remote surgery. These application scenarios impose stricter requirements on reliability and a latency.

In a process in which the terminal device and the network device perform service transmission, the terminal device may receive downlink information from the network device, and feed back response information corresponding to the downlink information to the network device. A specific process may include the following steps.

The terminal device receives the downlink information from the network device, decodes the downlink information, and feeds back the response information to the network device based on a decoding result. For example, if downlink information reception succeeds, the terminal device feeds back a reception success message such as an ACK to the network device; or if downlink information reception fails, the terminal device feeds back a reception failure message such as a NACK to the network device. The network device determines, based on the response information fed back by the terminal device, whether the downlink information is successfully received. For example, if the response information is the ACK, it indicates that the terminal device successfully receives the downlink information, and the network device does not need to resend the downlink information to the terminal device; or if the response information is the NACK, it indicates that the terminal device does not successfully receive the downlink information, and the network device can resend the downlink information to the terminal device, to improve reliability of sending the downlink information.

Figure 2:
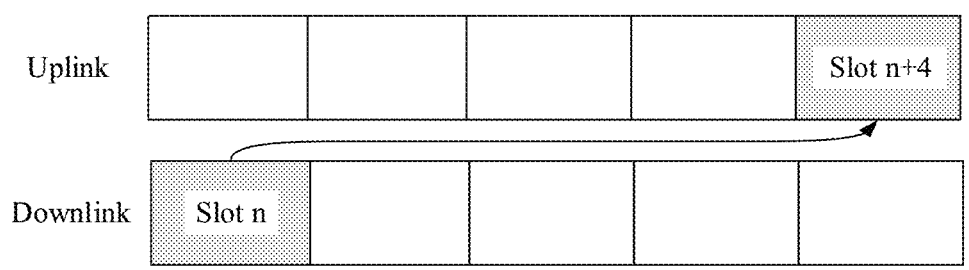
FIG. 2 is a schematic diagram of feeding back response information.

To save uplink resources, the terminal device may feed back response information of a plurality of pieces of downlink information in one feedback. In this way, before feeding back the response information to the network device, the terminal device first determines a time parameter set, for example, a time parameter set A. The time parameter set A corresponds to a time unit length, and the time unit length may be a slot. The time parameter set A includes at least one time parameter, and the time parameter is used to indicate a quantity of slots between receiving first downlink information from the network device by the terminal device and feeding back, by the terminal device to the network device, first response information corresponding to the first downlink information. For example, as shown in FIG. 2, the terminal device receives the first downlink information from the network device in a downlink time unit slot n. If the time parameter is 4, the terminal device may send the response information corresponding to the first downlink information to the network device in an uplink time unit slot n+4.

Figure 3:
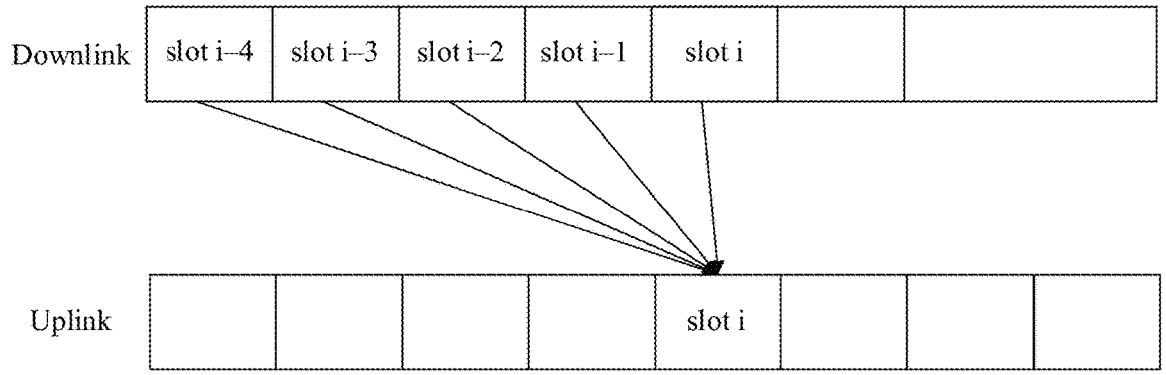
FIG. 3 is a schematic diagram of determining a time based on a first time and a time parameter set.

After determining the time parameter set A, the terminal device determines Q times based on a first time at which the response information is sent and the time parameter set A, where Q is a positive integer. For example, as shown in FIG. 3, it is assumed that a time unit corresponding to the first time is slot i, and the time parameter set A is {0, 1, 2, 3, 4}. Based on time parameters in the time parameter set A, counting corresponding time parameters backward from a downlink time unit slot i, it may be determined that five time units are slot i–4, slot i–3, slot i–2, slot i–1, and slot i. Response information corresponding to downlink information received in slot i–4, slot i–3, slot i–2, slot i–1 and slot i is fed back in an uplink time unit slot i corresponding to the first time. Therefore, five times may be determined, Q=5, and the five times are separately receiving times corresponding to downlink time units slot i–4, slot i–3, slot i–2, slot i–1, and slot i.

The first time may be indicated to the terminal device by the network device by using indication information, or may be predefined, for example, specified in a protocol. The indication information may be carried in DCI, or may be carried in higher layer signaling.

After determining the Q times based on the first time and the time parameter set A, the terminal device may determine downlink information received at each of the Q times, and further determine response information corresponding to each piece of the downlink information. Then, a codebook is determined based on the response information. That is, the codebook includes response information corresponding to downlink information received at at least one of the Q times. Then, the codebook is sent at the first time.

The codebook may be a semi-static codebook or a dynamic codebook. For different codebook types, processes in which Q times are determined and codebooks are generated are different. A specific type of the codebook used by the terminal device is configured by the network device.

If the terminal device is configured to use the semi-static codebook, a codebook generation process may include the following steps.

For example, when the terminal device determines the time parameter set A, the terminal device determines, based on the first time and the time parameter set A, a location of downlink information corresponding to the response information sent at the first time, and further determines the Q times.

A time 1 in the Q times is used as an example. For descriptions about another time, refer to those of the time 1. It is assumed that a downlink time unit corresponding to the time 1 is slot i–4 in FIG. 3.

The network device sends configuration information to the terminal device. The configuration information is a time domain resource table. The table may include a maximum of 16 rows, and each row indicates a start symbol S and a quantity L of symbols that are of one time domain resource. S is used to indicate a start symbol location of a time domain resource occupied by data in one slot, and L indicates a quantity of time domain symbols occupied by the data in one slot.

Figure 4:
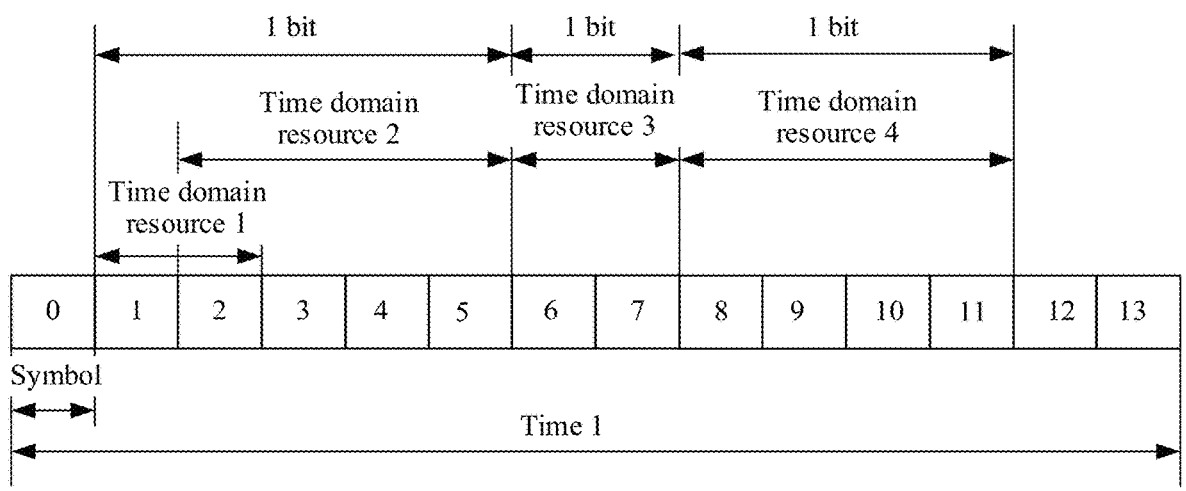
FIG. 4 is a schematic diagram of determining a PDSCH occasion according to an embodiment of this application.

It is assumed that four rows of a table are configured for the terminal device, and the four rows of the table correspond to four time domain resources. Slot i–4 includes 14 symbols. A time domain resource 1 is {symbol 1, symbol 2}. A time domain resource 2 is {symbol 2, symbol 3, symbol 4, symbol 5}. A time domain resource 3 is {symbol 6, symbol 7}. A time domain resource 4 is {symbol 8, symbol 9, symbol 10, symbol 11}. As shown in FIG. 4, in slot i–4, the terminal device determines that there are a plurality of PDSCH occasions. Specifically, the terminal device determines a time domain resource whose end symbol is the foremost in time domain as the first time domain resource, then determines a time domain resource that overlaps the first time domain resource in time domain, and determines the overlapping time domain resources as one PDSCH occasion. Then, the terminal device uses a time domain resource that is in a remaining time domain resource and whose end symbol is the foremost in time domain as the first time domain resource, and continues to determine a next PDSCH occasion according to the foregoing method, to obtain a plurality of PDSCH occasions. As shown in FIG. 4, the time domain resource 1 overlaps the time domain resource 2. Therefore, the time domain resource 1 and the time domain resource 2 are determined as one PDSCH occasion. Then, the time domain resource 3 is used as the first time domain resource. Because no time domain resource overlaps the time domain resource 3, the time domain resource 3 is determined as one PDSCH occasion. Then, the time domain resource 4 is used as the first time domain resource. Because no time domain resource overlaps the time domain resource 4, the time domain resource 4 is determined as one PDSCH occasion. In this way, three possible PDSCH occasions may be obtained. It is assumed that each PDSCH occasion corresponds to 1-bit response information. In this case, a total of 3-bit response information needs to be fed back in slot i–4. It is assumed that the terminal device receives the downlink information on the time domain resource 3 in slot i–4, and the feedback information corresponding to the downlink information is fed back in slot i–4, the time domain resource 3 corresponds to the second bit in the 3-bit response information in slot i−4. If the downlink information is successfully decoded, the second bit in the response information corresponding to slot i−4 is determined to be the ACK. If decoding fails, the second bit in the response information corresponding to slot i−4 is determined to be the NACK. Response information for feedback information corresponding to another time domain resource is also generated in the same method. In this way, the response information corresponding to slot i−4 is formed.

With reference to the foregoing method, the response information corresponding to each of the Q times may be obtained. Then, the response information bits are connected in serial to generate the codebook, and the codebook is sent to the network device.

If the terminal device is configured to use the dynamic codebook, a codebook generation process may include the following steps.

For example, when the terminal device determines the time parameter set A, the terminal device determines, based on the first time and the time parameter set A, all possible locations of downlink information corresponding to the response information sent at the first time. For example, as shown in FIG. 3, it is assumed that a time unit corresponding to the first time is slot i, and the time parameter set A is {0, 1, 2, 3, 4}. Starting from a downlink time unit slot i, based on time parameters in the time parameter set A, counting corresponding time parameters backward from the downlink slot i, it may be determined that five downlink time units are slot i−4, slot i−3, slot i−2, slot i−1, and slot i. Response information corresponding to downlink information received in slot i−4, slot i−3, slot i−2, slot i−1, and slot i may all be fed back in an uplink time unit slot i corresponding to the first time. Therefore, five times may be determined, that is, Q=5.

Figure 5:
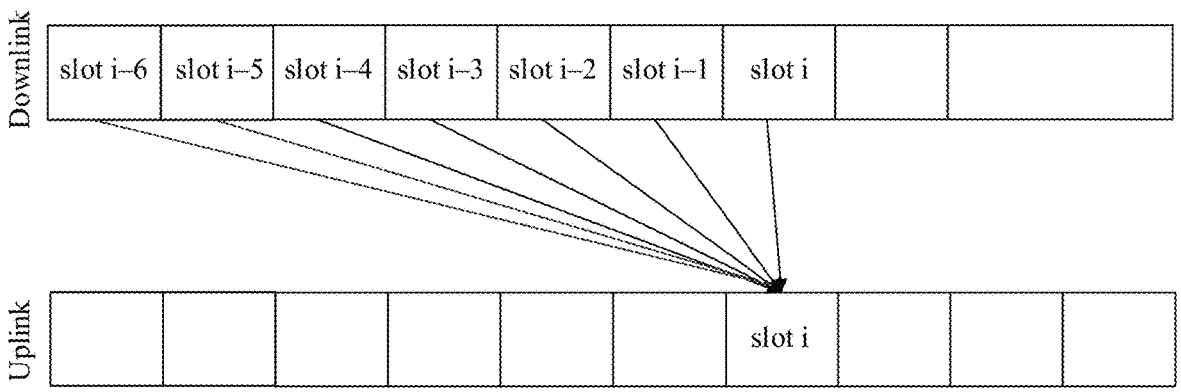
FIG. 5 is a schematic diagram of determining a slot in which a PDCCH may exist according to an embodiment of this application.

Then, a time unit in which a PDCCH is located is determined based on a set of K0, where K0 is a quantity of time units between the PDCCH and a corresponding PDSCH. The network device sends configuration information to the terminal device. The configuration information is a time domain resource table. The table includes a maximum of 16 rows, and each row indicates a value of K0. It is assumed that all values of K0 are {0, 1, 2}, 0, 1, and 2 slots are counted backward from each slot in the downlink time units slot i−4, slot i−3, slot i−2, slot i−1, and slot i, and a slot in which a PDCCH corresponding to downlink information may exist is determined, where the downlink information corresponds to response information that may be sent at the first time. As shown in FIG. 5, counting 0, 1, and 2 slots backward from the downlink time unit slot i−4, it is determined that the slots in which the PDCCH may be located are slot i−4, slot i−5, and slot i−6; counting 0, 1, and 2 slots backward from the downlink time unit slot i−3, it is determined that the slots in which the PDCCH may be located are slot i−3, slot i−4, and slot i−5; counting 0, 1, and 2 slots backward from the downlink time unit slot i−2, it is determined that the slots in which the PDCCH may be located are slot i−2, slot i−3, and slot i−4; counting 0, 1, and 2 slots backward from the downlink time unit slot i−1, it is determined that the slots in which the PDCCH may be located are slot i−1, slot i−2, and slot i−3; and counting 0, 1, and 2 slots backward from the downlink time unit slot i, it is determined that the slots in which the PDCCH may be located are slot i, slot i−1, and slot i−2. Therefore, seven possible slots in which the PDCCH corresponding to the downlink information may exist can be determined, including slot i, slot i−1, slot i−2, slot i−3, slot i−4, slot i−5, and slot i−6, where the downlink information corresponds to the response information that may be sent at the first time.

Then, a PDCCH occasion is determined. Herein, the time 1 in the Q times is used as an example. For another time, refer to the time 1. It is assumed that a downlink time unit corresponding to the time 1 is slot i−4 in FIG. 3.

Figure 6:
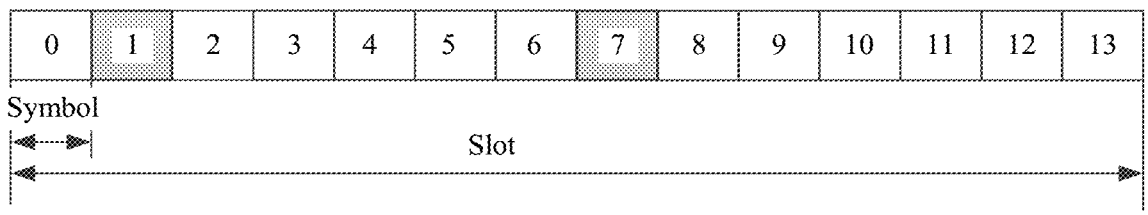
FIG. 6 is a schematic diagram of determining a PDCCH occasion according to an embodiment of this application.

The terminal device determines the PDCCH occasion based on the indication information sent by the network device. The indication information sent by the network device is used to indicate a 14-bit bitmap corresponding to 14 symbols in one slot, and the bitmap is used to indicate a specific location of the PDCCH occasion. The 14-bit bitmap configured by the network device is 01000001000000. It is assumed that 1 indicates that a corresponding symbol is the PDCCH occasion. As shown in FIG. 6, the bitmap indicates that symbol 1 and symbol 7 in one slot are corresponding PDCCH occasions. According to this method, possible PDCCH occasions corresponding to the Q times can be determined.

If the PDCCH is received in one of possible PDCCH occasions corresponding to the Q times, and the PDCCH schedules one piece of downlink data or the PDCCH indicates SPS release, response information corresponding to the downlink data or response information corresponding to the SPS release needs to be sent at the first time. According to this method, response information that may need to be sent at the first time is determined. Then all feedback information is connected in serial to generate the codebook, and the codebook is sent to the network device.

In an implementation of this application, after generating the codebook in the foregoing manner, the terminal device sends the codebook to the network device. Correspondingly, the network device may receive the codebook at the first time.

After receiving the codebook, the network device parses the codebook to obtain response information included in the codebook. Then, downlink information corresponding to the response information is determined based on the response information. To be specific, it is determined that the response information is response information of which downlink information, so that the network device determines, based on the response information of the downlink information, whether to resend the corresponding downlink information. For example, if the response information is the ACK, it indicates that the terminal device receives the downlink information corresponding to the response information, and the network device does not need to resend the downlink information; or if the response information is the NACK, it indicates that the terminal device fails to receive the downlink information corresponding to the response information, and the network device may resend the downlink information.

It can be learned from the foregoing description that the network device determines the Q times based on the first time and the time parameter set A after receiving the codebook. In this way, it can be determined that the response information included in the codebook is response information corresponding to downlink information received at which time in the Q times. A process in which the network device determines the Q times based on the time parameter set A and the first time is the same as that of the terminal device. Details are not described herein again.

When a URLLC service is transmitted between the terminal device and the network device, a transmission latency of the URLLC service is relatively low. It can be learned from the foregoing description that, when a time unit length corresponding to a time parameter set is one slot, after each piece of downlink information is received, the terminal device can send the feedback information corresponding to the downlink information only after waiting for a plurality of slots. In other words, the terminal device can send the codebook to the network device only after the codebook is generated based on all information that needs to be fed back in a slot that is fed back. Consequently, a transmission latency cannot meet a requirement of a low-latency service such as URLLC.

To reduce a feedback latency to allow the terminal device to feed back the corresponding response information as soon as possible after receiving the downlink information, the time unit length corresponding to the time parameter set may be reduced. For example, the time unit length corresponding to the time parameter set is changed from a slot to ½ slot or a symbol.

However, to ensure compatibility of a plurality of generations of communications system, it is not enough to only shorten the time unit length corresponding to the time parameter set. There may be N time parameter sets, and N is greater than or equal to 2. In the N time parameter sets, a time unit length corresponding to a part of time parameter sets is the same as the previous time unit length, for example, is still one slot, and a time unit length corresponding to a part of time parameter sets becomes smaller, for example, becomes ½ slot. In this way, time unit lengths corresponding to at least two of the N time parameter sets are different. However, when the time unit lengths corresponding to the at least two of the N time parameter sets are different, an appropriate codebook needs to be determined.

To resolve the foregoing problem, this application provides a communication method, an apparatus, a device, a system, and a storage medium, to accurately determine the codebook when the time unit lengths corresponding to the at least two of the N time parameter sets are different.

Figure 7:
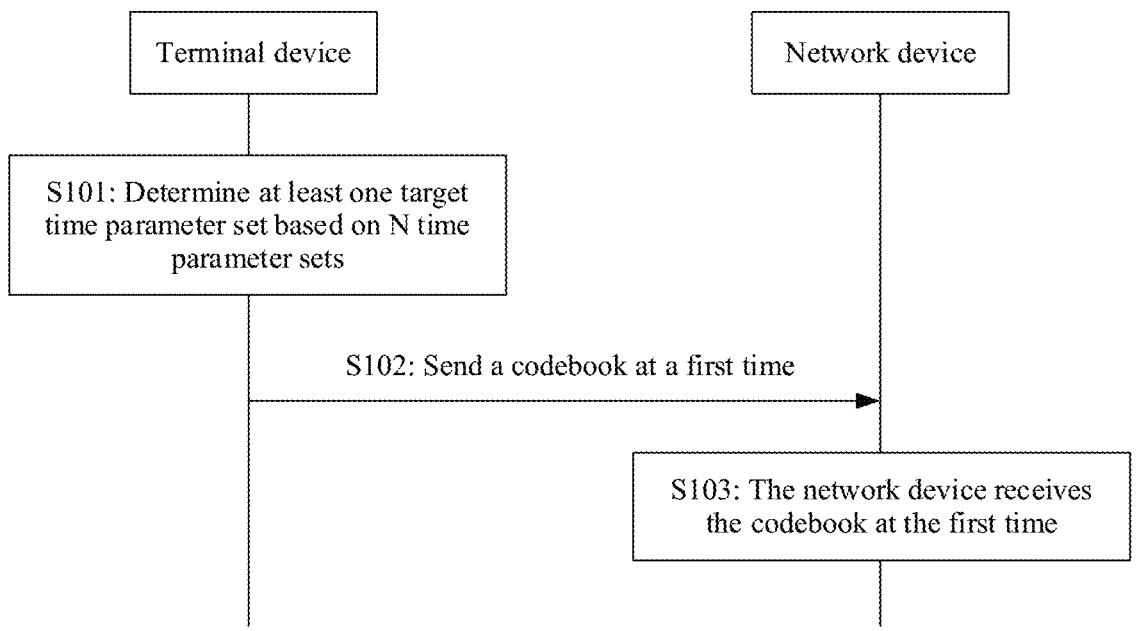
FIG. 7 is a flowchart of a communication method according to an embodiment of this application.

FIG. 7 is a flowchart of a communication method according to an embodiment of this application. As shown in FIG. 7, the method according to this embodiment of this application may include the following steps.

S101: A terminal device determines at least one target time parameter set based on N time parameter sets.

N is a positive integer greater than or equal to 2, and time unit lengths corresponding to at least two of the N time parameter sets are different. For example, N is 3, and three time parameter sets are separately denoted as a time parameter set a, a time parameter set b, and a time parameter set c. Optionally, time unit lengths corresponding to two of the three time parameter sets are different. For example, a time unit length corresponding to the time parameter set a and a time unit length corresponding to the time parameter set b are different, or a time unit length corresponding to the time parameter set a and a time unit length corresponding to the time parameter set c are different, or a time unit length corresponding to the time parameter set b and a time unit length corresponding to the time parameter set c are different. Optionally, time unit lengths corresponding to the three time parameter sets are all different. That is, time unit lengths corresponding to the time parameter set a, the time parameter set b, and the time parameter set c are all different.

Each of the N time parameter sets includes at least one time parameter, and the time parameter is used to indicate a quantity of time units between receiving first downlink information and feeding back first response information corresponding to the first downlink information. Refer to FIG. 2. A time unit length corresponding to the interval is a time unit length corresponding to a time parameter set in which the time parameter is located. For example, there are two time parameter sets, that is, N=2, a first time parameter set is {1, 2, 3, 4}, and a corresponding time unit length is one slot. In this case, 1, 2, 3, and 4 in the first time parameter set are used to indicate that quantities of slots between receiving the first downlink information and feeding back the first response information corresponding to the first downlink information are separately 1, 2, 3, and 4. A second time parameter set is {0, 1, 2, 3, 4}, and a corresponding time unit length is two time domain symbols. In this case, 0, 1, 2, 3, and 4 in the second time parameter set are used to indicate that quantities of two time domain symbols between receiving the first downlink information and feeding back the first response information corresponding to the first downlink information are separately 0, 1, 2, 3, and 4.

Optionally, each of the N time parameter sets corresponds to a DCI format, and DCI formats corresponding to the at least two of the N time parameter sets are different. For example, N is 2. It is assumed that a DCI format corresponding to the first time parameter set is a first DCI format, and the first DCI format may be a DCI format 1_0, or may be referred to as full feedback DCI, and may be used to perform data scheduling in a radio resource control (RRC) establishment or an RRC reconfiguration process; and a DCI format corresponding to the second time parameter set is a second DCI format, and the second DCI format may be a DCI format 1_1 used to perform data scheduling after the RRC establishment.

S102: The terminal device sends a codebook at a first time.

The codebook includes response information corresponding to downlink information received at at least one of M target times, the M target times are determined based on the first time and the at least one target time parameter set, and M is a positive integer.

Specifically, the terminal device determines at least one target time parameter set according to step S101, and determines, based on the determined at least one target time parameter set, a time, namely, a target time, in which downlink information is located, where the downlink information corresponds to response information that may be sent at the first time.

After determining the M target times, the terminal device generates the codebook. The codebook includes response information corresponding to downlink information received at at least one of the M target times. The codebook may be a semi-static codebook or a dynamic codebook. For different codebook types, processes in which codebooks are generated are different. Specifically, refer to the process in a conventional technology in which the codebook is generated after the Q times are determined. A specific type of the codebook used by the terminal device is configured by a network device.

S103: The network device receives the codebook at the first time.

After receiving the codebook, the network device parses the codebook to obtain response information included in the codebook. Then, downlink information corresponding to the response information is determined based on the response information. To be specific, it is determined that the response information is response information of which downlink information, so that the network device determines, based on the response information of the downlink information, whether to resend the corresponding downlink information. For example, if the response information is the ACK, it indicates that the terminal device receives the downlink information corresponding to the response information, and the network device does not need to resend the downlink information; or if the response information is the NACK, it indicates that the terminal device fails to receive the downlink information corresponding to the response information, and the network device may resend the downlink information.

In other words, after receiving the codebook, the network device needs to determine the target time parameter set, and determine the M target times based on the first time and the target time parameter set. In this way, it can be determined that the response information included in the codebook is response information corresponding to downlink information received at which target time in the M target times. A specific process in which the network device determines the target time parameter set and determines the M target times based on the target time parameter set and the first time is the same as that of the terminal device. Details are not described herein again.

According to the communication method provided in the embodiments of this application, the terminal device determines the at least one target time parameter set based on the N time parameter sets, where the time unit lengths corresponding to the at least two of the N time parameter sets are different. Each time parameter set includes the at least one time parameter, and the time parameter is used to indicate the quantity of time units between receiving the first downlink information by the terminal device and feeding back, by the terminal device to the network device, the first response information corresponding to the first downlink information. Then, the terminal device determines the M target times based on the first time and the at least one target time parameter set, generates the codebook based on the response information corresponding to the downlink information received at at least one of the M target times, and then sends the codebook to the network device at the first time. After receiving the codebook, the network device parses the codebook, and determines, based on the response information included in the codebook, whether the downlink information corresponding to the response information is successfully transmitted. In other words, according to the embodiments of this application, when the time unit lengths corresponding to at least two of the N time parameter sets are different, the terminal device can effectively generate the codebook, and the network device can effectively parse the codebook. In this way, it is ensured that the network device and the terminal device have a consistent understanding of the codebook, thereby ensuring communication effectiveness and improving resource utilization.

Figure 8:
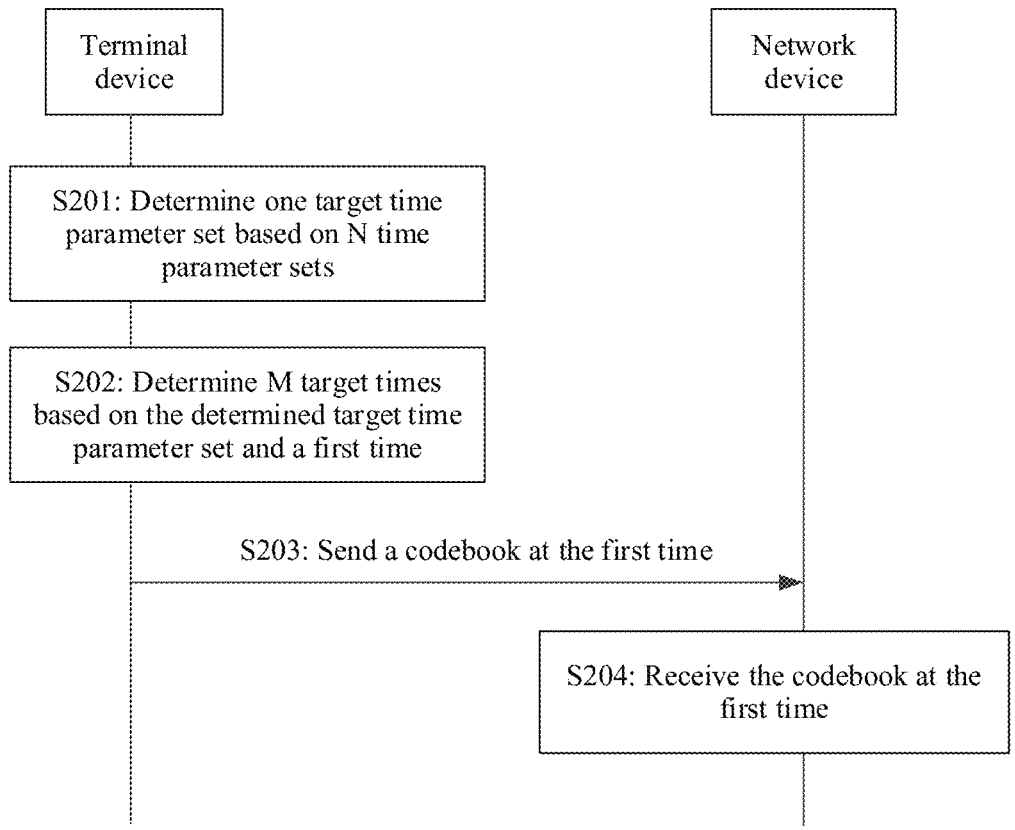
FIG. 8 is a flowchart of a communication method according to an embodiment of this application.

FIG. 8 is a flowchart of a communication method according to an embodiment of this application. Based on the foregoing embodiments, as shown in FIG. 8, the method according to this embodiment of this application includes the following steps.

S201: The terminal device determines one target time parameter set based on the N time parameter sets.

Optionally, the terminal device may determine the target time parameter set in any one of the following manners. It may be understood that the following manners are merely examples, and do not constitute any limitation on this application. In addition, it may be understood that a process in which the network device determines the at least one target time parameter set is the same as that of the terminal device. Herein, the terminal device is used as an example. For the process for the network device, refer to that for the terminal device. Details are not described again.

Manner 1: The terminal device determines one of the N time parameter sets as the target time parameter set.

Optionally, the terminal device determines the one of the N time parameter sets as the target time parameter set based on a predefinition.

For example, the terminal device uses, as the target time parameter set, a time parameter set predefined in the N time parameter sets that corresponds to a time unit length of a predefined value and/or a predefined DCI format.

For example, the predefined target time parameter set is a time parameter set in the N time parameter sets that corresponds to a time unit length of a predefined value. For example, N=3, that is, there are three time parameter sets. A time parameter set 1 is {0, 1, 2, 3, 4}, and a corresponding time unit length is one slot. A time parameter set 2 is {4, 5, 6}, and a corresponding time unit length is ½ slot. A time parameter set 3 is {1, 3, 5}, and a corresponding time unit length is 2 slots. For example, the predefined target time parameter set is a time parameter set in the N time parameter sets that corresponds to a time unit length of a slot. In this case, the determined target time parameter set is the time parameter set 1 that is {0, 1, 2, 3, 4}. Alternatively, the predefined target time parameter set is a time parameter set in the N time parameter sets that corresponds to a time unit length less than a slot. In this case, the determined target time parameter set is the time parameter set 2 that is {4, 5, 6}. Alternatively, the predefined target time parameter set is a time parameter set in the N time parameter sets that corresponds to the greatest time unit length. In this case, the determined target time parameter set is the time parameter set 3 that is {1, 3, 5}. Alternatively, the predefined target time parameter set is a time parameter set in the N time parameter sets that corresponds to the smallest time unit length. In this case, the determined target time parameter set is the time parameter set 2 that is {4, 5, 6}.

For example, the predefined target time parameter set is a time parameter set in the N time parameter sets that corresponds to a predefined DCI format. For example, N=3, that is, there are three time parameter sets. A time parameter set 1 is {0, 1, 2, 3, 4}, and a corresponding DCI format is a first DCI format. A time parameter set 2 is {4, 5, 6}, and a corresponding DCI format is a second DCI format. A time parameter set 3 is {1, 3, 5}, and a corresponding DCI format is the third DCI format. For example, the predefined target time parameter set is a time parameter set in the N time parameter sets that corresponds to the second DCI format. In this case, the determined target time parameter set is the time parameter set 3 that is {1, 3, 5}.

For example, the predefined target time parameter set is a time parameter set in the N time parameter sets that corresponds to a time unit length of a predefined value and a predefined DCI format. For example, N=3, that is, there are three time parameter sets. A time parameter set 1 is {0, 1, 2, 3, 4}, a corresponding time unit length is one slot, and a corresponding DCI format is the first DCI format. A time parameter set 2 is {4, 5, 6}, a corresponding time unit length is ½ slot, and a corresponding DCI format is the second DCI format. A time parameter set 3 is {1, 3, 5}, a corresponding time unit length is 2 slots, and a corresponding DCI format is the first DCI format. For example, the predefined target time parameter set is a time parameter set in the N time parameter sets that corresponds to a time unit length of ½ slot and the second DCI format. In this case, the determined target time parameter set is the time parameter set 2 that is {4, 5, 6}.

Optionally, the terminal device may further determine one of the N time parameter sets as the target time parameter set based on indication information sent by the network device. For example, the network device determines the time parameter set 1 from the N time parameter sets as the target time parameter set, and sends the indication information to the terminal device. The indication information is used to indicate the terminal device to use the time parameter set 1 in the N time parameter sets as the target time parameter set. Optionally, the indication information is carried in higher layer signaling.

Optionally, N=2, and there are two time parameter sets separately corresponding to the first DCI format and the second DCI format. If the network device sends the indication information to indicate that DCI in the second format needs to be blindly detected, the target time parameter set is a time parameter set corresponding to the second DCI format; if the DCI in the second format is not configured to be blindly detected, the target time parameter set is a time parameter set corresponding to the first DCI format.

Manner 2: The terminal device uses, as the target time parameter set, a time parameter set that is an intersection set or a union set of the N time parameter sets.

It is assumed that N is 2. The terminal device obtains an intersection set or a union set of the two time parameter sets, to combine the two time parameter sets as one time parameter set, and uses the combined time parameter set as the target time parameter set.

Optionally, the terminal device converts a time unit length corresponding to each of the N time parameter sets into a target time unit length, to obtain N converted time parameter sets; and obtains an intersection set or a union set of the N converted time parameter sets, to obtain a combined time parameter set, and uses the combined time parameter set as the target time parameter set.

In this manner, if time unit lengths corresponding to the two time parameter sets are different, the time unit lengths corresponding to the two time parameter sets are converted into a same length. To be specific, each of the two time parameter sets is converted into a time parameter set whose corresponding time unit length is the target time unit length. For example, the two time parameter sets are separately a time parameter set 1 and a time parameter set 2. The time parameter set 1 is {1, 2, 3, 4}, and a corresponding time unit length is a slot. The time parameter set 2 is {0, 1, 2, 3}, and a corresponding time unit length is ½ slot. In this way, the time unit length corresponding to the time parameter set 1 needs to be converted from the slot to ½ slot. A time parameter set 1 whose time unit length is ½ slot and that is {1, 2, 3, 4, 5, 6, 7, 8} may be obtained, or a time parameter set 1 whose time unit length is ½ slot and that is {2, 4, 6, 8} is obtained.

After the time unit lengths corresponding to the time parameter set 1 and the time parameter set 2 are converted into the same length, an intersection set or a union set of the two time parameter sets is obtained to obtain the combined time parameter set, and the combined time parameter set is used as the target time parameter set.

For example, after the time parameter set 1 {1, 2, 3, 4} is converted into the time parameter set {1, 2, 3, 4, 5, 6, 7, 8} whose time unit length is ½ slot, a union set of the time parameter set {1, 2, 3, 4, 5, 6, 7, 8} and the time parameter set 2 {1, 2, 3, 4} whose time unit length is ½ slot is obtained, to obtain a combined time parameter set {0, 1, 2, 3, 4, 5, 6, 7, 8}. The time parameter set {0, 1, 2, 3, 4, 5, 6, 7, 8} is used as the target time parameter set, and a time unit length corresponding to the time parameter set {0, 1, 2, 3, 4, 5, 6, 7, 8} is ½ slot. Alternatively, after the time parameter set 1 {1, 2, 3, 4} is converted into the time parameter set {2, 4, 6, 8} whose time unit length is ½ slot, a union set of the time parameter set {2, 4, 6, 8} and the time parameter set 2 {1, 2, 3, 4} whose time unit length is ½ slot is obtained, to obtain a combined time parameter set {0, 1, 2, 3, 4, 6, 8}. The time parameter set {0, 1, 2, 3, 4, 6, 8} is used as the target time parameter set, and a time unit length corresponding to the time parameter set {0, 1, 2, 3, 4, 6, 8} is ½ slot.

For example, after the time parameter set 1 {1, 2, 3, 4} is converted into the time parameter set {1, 2, 3, 4, 5, 6, 7, 8} whose time unit length is ½ slot, an intersection set of the time parameter set {1, 2, 3, 4, 5, 6, 7, 8} and the time parameter set 2 {1, 2, 3, 4} whose time unit length is ½ slot is obtained, to obtain a combined time parameter set {1, 2, 3}. The time parameter set {1, 2, 3} is used as the target time parameter set, and a time unit length corresponding to the time parameter set {1, 2, 3} is ½ slot. Alternatively, after the time parameter set 1 {1, 2, 3, 4} is converted into the time parameter set {2, 4, 6, 8} whose time unit length is ½ slot, an intersection set of the time parameter set {2, 4, 6, 8} and the time parameter set 2 {1, 2, 3, 4} whose time unit length is ½ slot is obtained, to obtain a combined time parameter set {2}. The time parameter set {2} is used as the target time parameter set, and a time unit length corresponding to the time parameter set {2} is ½ slot.

Optionally, the foregoing target time unit length may be a greatest common divisor of time unit lengths corresponding to the N time parameter sets. For example, N is 2, the time unit length corresponding to the time parameter set 1 is a slot, and the time unit length corresponding to the time parameter set 2 is ½ slot. In this case, a greatest common divisor of the time unit lengths corresponding to the time parameter set 1 and the time parameter set 2 is ½ slot. Therefore, the time unit lengths corresponding to the time parameter set 1 and the time parameter set 2 may be converted into ½ slot.

Manner 3: The terminal device obtains an intersection set or a union set of time parameter sets that are in the N time parameter sets and that correspond to a same DCI format, to obtain at least two combined time parameter sets; and uses one of the at least two combined time parameter sets as the target time parameter set.

That the terminal device obtains an intersection set or a union set of time parameter sets that are in the N time parameter sets and that correspond to a same DCI format, to obtain at least two combined time parameter sets may be: The terminal device first converts a time unit length corresponding to each of at least one time parameter set that is in the N time parameter sets and that corresponds to a same DCI format into a target time unit length, to obtain at least one converted time parameter set corresponding to each DCI format, and obtains an intersection set or a union set of the at least one converted time parameter set corresponding to each DCI format, to obtain a combined time parameter set corresponding to each DCI format, and further to obtain the at least two combined time parameter sets. Optionally, the target time unit length may be a greatest common divisor of time unit lengths corresponding to the at least one time parameter set corresponding to the same DCI format. For a specific manner of obtaining an intersection set or a union set of time parameter sets that are in the N time parameter sets and that correspond to a same DCI format, refer to a manner of obtaining an intersection set or a union set of the N time parameter sets in the manner 2. Details are not described again.

In the embodiments of this application, that the terminal device uses one of the obtained at least two combined time parameter sets as the target time parameter set may be: The terminal device uses, as the target time parameter set, a time parameter set predefined in the at least two combined time parameter sets that corresponds to a time unit length of a predefined value and/or a predefined DCI format.

For example, it is assumed that N is 4, and the four time parameter sets are separately a time parameter set 3, a time parameter set 4, a time parameter set 5, and a time parameter set 6. A DCI format corresponding to the time parameter set 3 and the time parameter set 4 is the first DCI format, and a DCI format corresponding to the time parameter set 5 and the time parameter set 6 is the second DCI formats. An intersection set or a union set of the time parameter set 3 and the time parameter set 4 is obtained. If time unit lengths corresponding to the time parameter set 3 and the time parameter set 4 are different, an intersection set or a union set is obtained after the time units are converted into time units of a same length, a time parameter set 7 is obtained. For a process of obtaining the intersection set or the union set, refer to the description in the manner 2. Details are not described herein again. Similarly, an intersection set or a union set of the time parameter set 5 and the time parameter set 6 is obtained, to obtain a time parameter set 8. Then, a time parameter set in the time parameter set 7 and the time parameter set 8 is used as the target time parameter set. For example, a time parameter set in the time parameter set 7 and the time parameter set 8 that corresponds to a time unit length of a predefined value is used as the target time parameter set. Alternatively, a time parameter set in the time parameter set 7 and the time parameter set 8 that corresponds to a predefined DCI format is used as the target time parameter set. Alternatively, a time parameter set in the time parameter set 7 and the time parameter set 8 that corresponds to a time unit length of a predefined value and a predefined DCI format is used as the target time parameter set. For details about how to select a time parameter set as the target time parameter set, refer to the description in the manner 1. Details are not described again.

S202: The terminal device determines M target times based on the determined target time parameter set and the first time.

M is a positive integer.

Optionally, after determining the target time parameter set according to the method in any one of the manner 1 to the manner 3, the terminal device may determine the M target times based on the determined target time parameter set and the first time.

Figure 9:
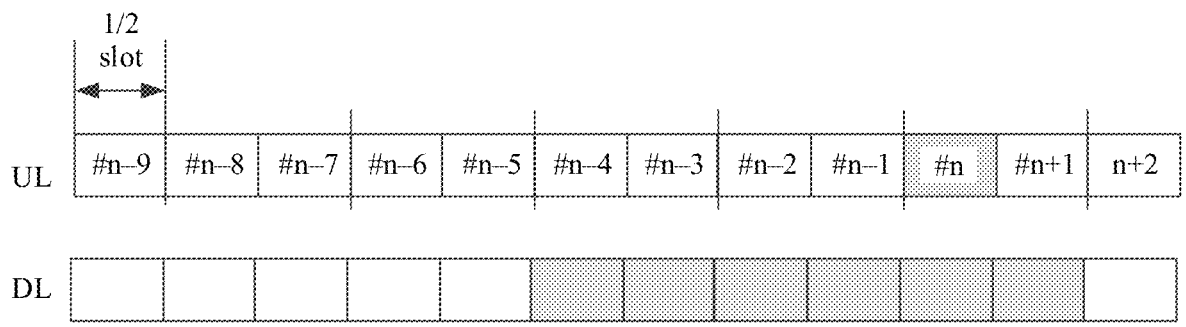
FIG. 9 and FIG. 10 are schematic diagrams of a manner of determining a target time.
Figure 10:
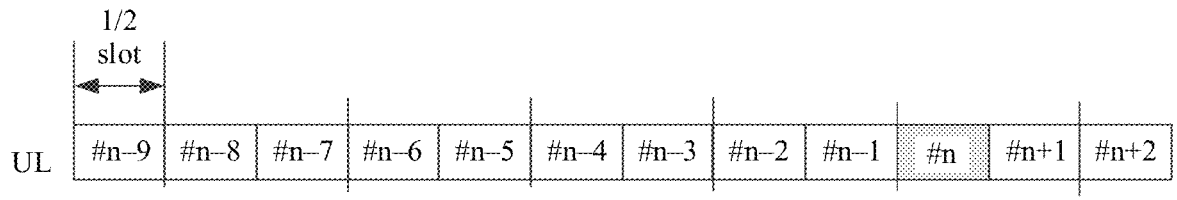
Figure 11:
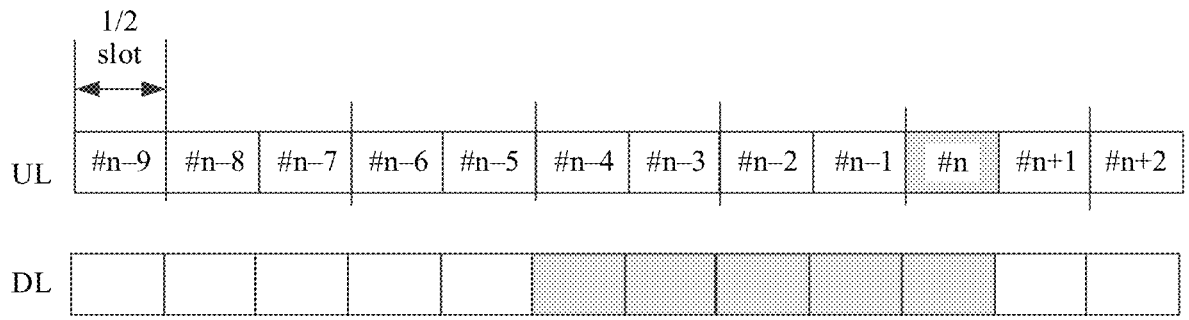
FIG. 11 and FIG. 12 are schematic diagrams of another manner of determining a target time.
Figure 12:
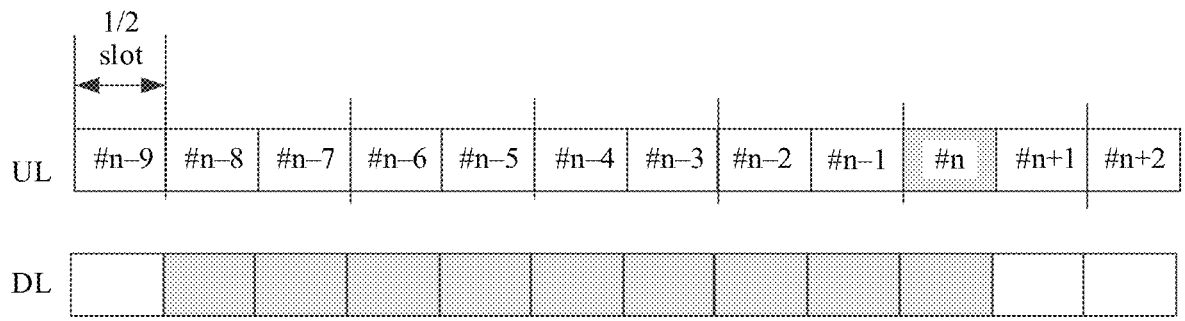
Figure 13:
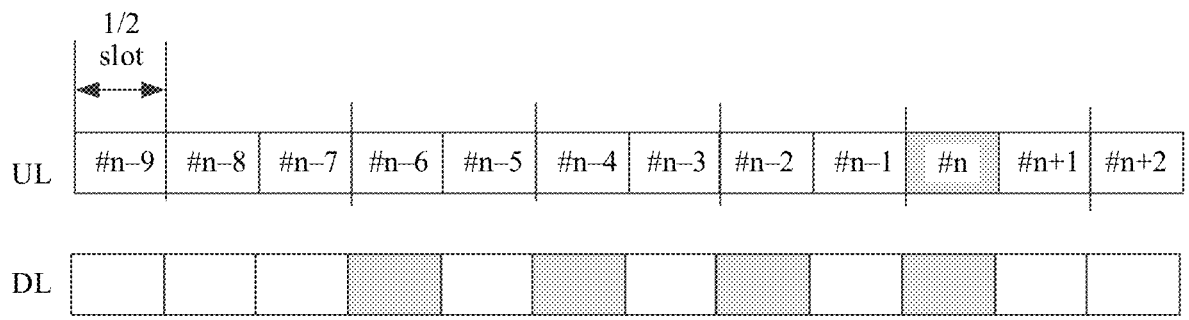
FIG. 13 is a schematic diagram of still another manner of determining a target time.
Figure 14:
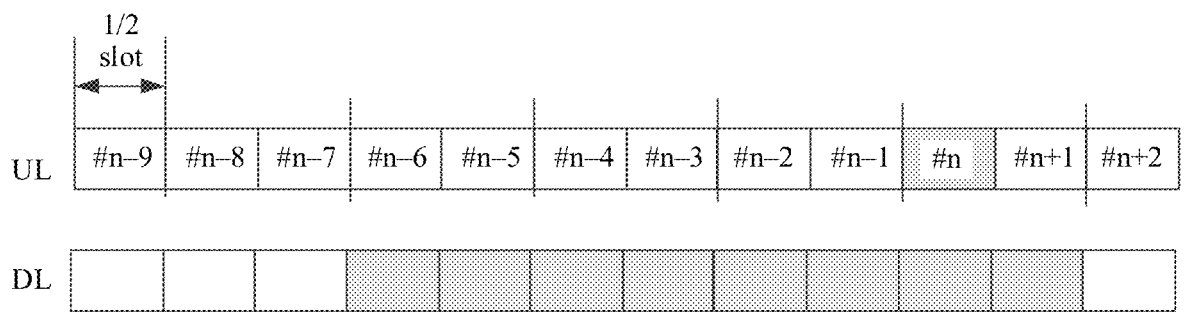
FIG. 14 is a schematic diagram of yet another manner of determining a target time.

Specifically, it is assumed that an uplink time unit corresponding to the first time is the $n^{th}$ ½ slot, and a time unit corresponding to the target time is a slot. For example, the determined target time parameter set is {0, 1, 2, 3}, and a time unit length, namely, a granularity, corresponding to the determined target time parameter set is ½ slot. As shown in FIG. 9, 0, 1, 2, and 3 ½ slots are separately counted backward from the $n^{th}$ ½ slot in the downlink slots, to obtain ½ slots that are numbered n, n−1, n−2, and n−3. As shown in FIG. 9, ½ slot n and ½ slot n+1 form a complete slot, ½ slot n−1 and ½ slot n−2 form a complete slot, and ½ slot n−3 and ½ slot n−4 form a complete slot. Therefore, times corresponding to the three slots are used as the M target times. For another example, the determined target time parameter set is {0, 1, 2, 3, 4, 5, 6, 7, 8}, and a time unit length, namely, a granularity, corresponding to the determined target time parameter set is ½ slot. As shown in FIG. 10, 0, 1, 2, 3, 4, 5, 6, 7, and 8 ½ slots are separately counted backward from the $n^{th}$ ½ slot in the downlink slots, to obtain downlink time units ½ slot n, ½ slot n−1, ½ slot n−2, ½ slot n−3, ½ slot n−4, ½ slot n−5, ½ slot n−6, ½ slot n−7, and ½ slot n−8. A time unit that occupies half a slot is supplemented to a complete slot. For example, ½ slot n and ½ slot n+1 form a complete slot. Therefore, times corresponding to five slots in which the downlink time units ½ slot n+1, ½ slot n, ½ slot n−1, ½ slot n−2, ½ slot n−3, ½ slot n−4, ½ slot n−5, ½ slot n−6, ½ slot n−7, and ½ slot n−8 are located are used as the target times.

It is assumed that an uplink time unit corresponding to the first time is the $n^{th}$ ½ slot, and a time unit corresponding to the target time is ½ slot. For example, the determined target time parameter set is {0, 1, 2, 3}, and a time unit length, namely, a granularity, corresponding to the determined target time parameter set is ½ slot. As shown in FIG. 11, 0, 1, 2, and 3 ½ slots are separately counted backward from the $n^{th}$ ½ slot in the downlink slots, to obtain ½ slots that are numbered n, n−1, n−2, and n−3. Times corresponding to the obtained downlink time units that are ½ slots numbered n, n−1, n−2, and n−3 are used as the M target times, to obtain four target times. For another example, the determined target time parameter set is {0, 1, 2, 3, 4, 5, 6, 7, 8}, and a time unit corresponding to the determined target time parameter set is ½ slot. As shown in FIG. 12, 0, 1, 2, 3, 4, 5, 6, 7, and 8 ½ slots are separately counted backward from the $n^{th}$ ½ slot in the downlink slots, to obtain downlink time units ½ slot n, ½ slot n−1, ½ slot n−2, ½ slot n−3, ½ slot n−4, ½ slot n−5, ½ slot n−6, ½ slot n−7, and ½ slot n−8. Times corresponding to these downlink time units are used as the target times.

It is assumed that an uplink time unit corresponding to the first time is the $n^{th}$ ½ slot, and a time unit corresponding to the target time is ½ slot. For example, the determined target time parameter set 1 is {0, 1, 2, 3}, and a time unit length, namely, a granularity, corresponding to the determined target time parameter set is a slot. As shown in FIG. 13, 0, 1, 2, and 3 slots are separately counted backward from the $n^{th}$ slot in the downlink slots, that is, 0, 2, 4, and 6 ½ slots are separately counted backward from the $n^{th}$ slot in the downlink slots, to obtain ½ slots that are numbered n, n−2, n−4, and n−6. Times corresponding to the obtained downlink time units that are ½ slots numbered n, n−2, n−4, and n−6 are used as the M target times, to obtain four target times.

It is assumed that an uplink time unit corresponding to the first time is the $n^{th}$ ½ slot, and a time unit corresponding to the target time is a slot. For another example, the determined target time parameter set 1 is {0, 1, 2, 3}, and a time unit length, namely, a granularity, corresponding to the determined target time parameter set is slot. As shown in FIG. 14, 0, 1, 2, and 3 slots are separately counted backward from the $n^{th}$ ½ slot in the downlink slots, that is, 0, 1, 2, 3, 4, 5, and 6 ½ slots are separately counted backward from the $n^{th}$ ½ slot in the downlink slots, to obtain downlink time units ½ slot n, ½ slot n−1, ½ slot n−2, ½ slot n−3, ½ slot n−4, ½ slot n−5, and ½ slot n−6. A time unit that occupies half a slot is supplemented to a complete slot. For example, ½ slot n and ½ slot n+1 form a complete slot. Therefore, times corresponding to four slots in which the downlink time units ½ slot n+1, ½ slot n, ½ slot n−1, ½ slot n−2, ½ slot n−3, ½ slot n−4, ½ slot n−5, and ½ slot n−6 are located are used as the target times.

S203: The terminal device sends a codebook at a first time.

Optionally, after determining the M target times according to the method described in S202, the terminal device generates the codebook based on response information corresponding to downlink information received at at least one of the M target times. For example, the codebook includes the response information corresponding to the downlink information received at the at least one of the M target times. Then, the terminal device sends the generated codebook to the network device at the first time.

For a specific process of generating the codebook, refer to S102. Details are not described again.

S204: The network device receives the codebook at the first time.

After receiving the codebook from the terminal device at the first time, the network device determines the target time parameter set, and determines the M target times based on the first time and the target time parameter set. In this way, it can be determined that the response information included in the codebook is response information corresponding to downlink information received at which target time in the M target times, to determine target time points at which the downlink information is successfully received at the M target times, and target time points at which the downlink information is not successfully received at the M target times.

A specific process in which the network device determines the target time parameter set and determines the M target times based on the target time parameter set and the first time is the same as that of the terminal device. Details are not described herein again.

According to the communication method provided in this embodiment of this application, the terminal device determines the target time parameter set based on the N time parameter sets, and determines the M target times based on the determined target time parameter set and the first time, to accurately determine the target time.

Figure 15:
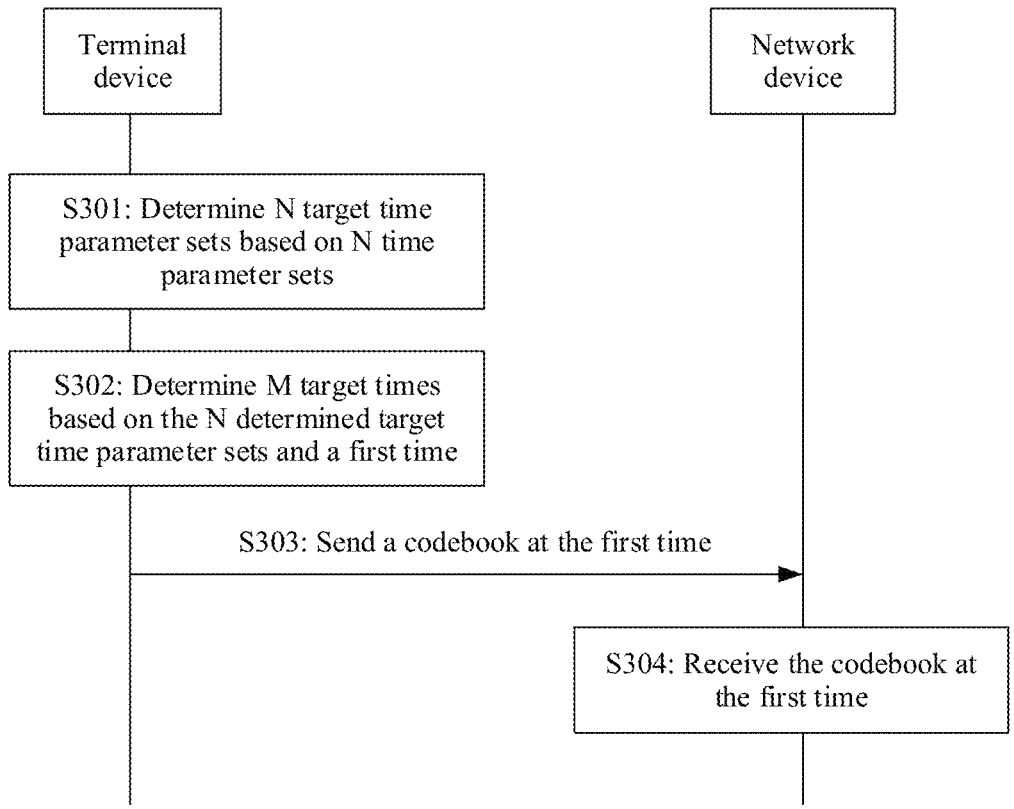
FIG. 15 is a flowchart of a communication method according to an embodiment of this application.

FIG. 15 is a flowchart of a communication method according to an embodiment of this application. Based on the foregoing embodiments, as shown in FIG. 15, the method according to this embodiment of this application includes the following steps.

S301: The terminal device determines N target time parameter sets based on the N time parameter sets.

Optionally, in an implementation of this application, the terminal device uses each of the N time parameter sets as a target time parameter set, to obtain N target time parameter sets.

For example, it is assumed that N is 2, and two time parameter sets are separately a time parameter set 1 and a time parameter set 2. The time parameter set 1 is {1, 2, 3, 4}, and a corresponding time unit length is a slot. The time parameter set 2 is {0, 1, 2, 3}, and a corresponding time unit length is ½ slot. In this case, it is determined that the two target time parameter sets are the time parameter set 1 and the time parameter set 2.

In addition, a process in which the network device determines the at least one target time parameter set is the same as that of the terminal device. Herein, the terminal device is used as an example. For the process for the network device, refer to that for the terminal device. Details are not described again.

S302: The terminal device determines M target times based on the N determined target time parameter set and the first time.

Optionally, in an implementation of this application, the terminal device determines a time set corresponding to each target time parameter set based on the first time and each of the N target time parameter sets, to obtain N time sets; and obtains an intersection set or a union set of the N time sets, to obtain the M target times.

Specifically, for a method of determining the time set corresponding to each target time parameter set, refer to the method of determining the M target times based on the first time and the target time parameter set in S202. A determined time set including the M target times is the time set corresponding to the target time parameter set. For example, if it is determined, based on the target time parameter set, that the M target times are five slots in which downlink time units ½ slot n+1, ½ slot n, ½ slot n−1, ½ slot n−2, ½ slot n−3, ½ slot n−4, ½ slot n−5, ½ slot n−6, ½ slot n−7, and ½ slot n−8 are located, the five slots belong to the time set corresponding to the target time parameter set.

The terminal device determines a time set corresponding to each target time parameter set, to obtain N time sets; and obtains an intersection set or a union set of the N time sets, to obtain the M target times.

Figure 16:
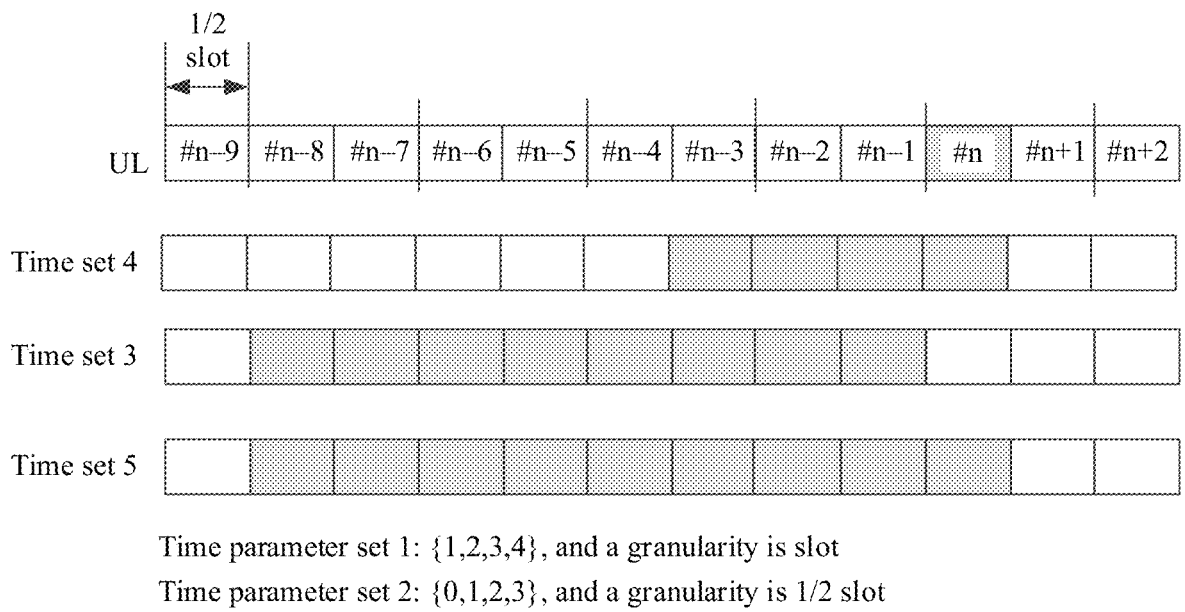
FIG. 16 is a schematic diagram of a manner of determining a target time.
Figure 17:
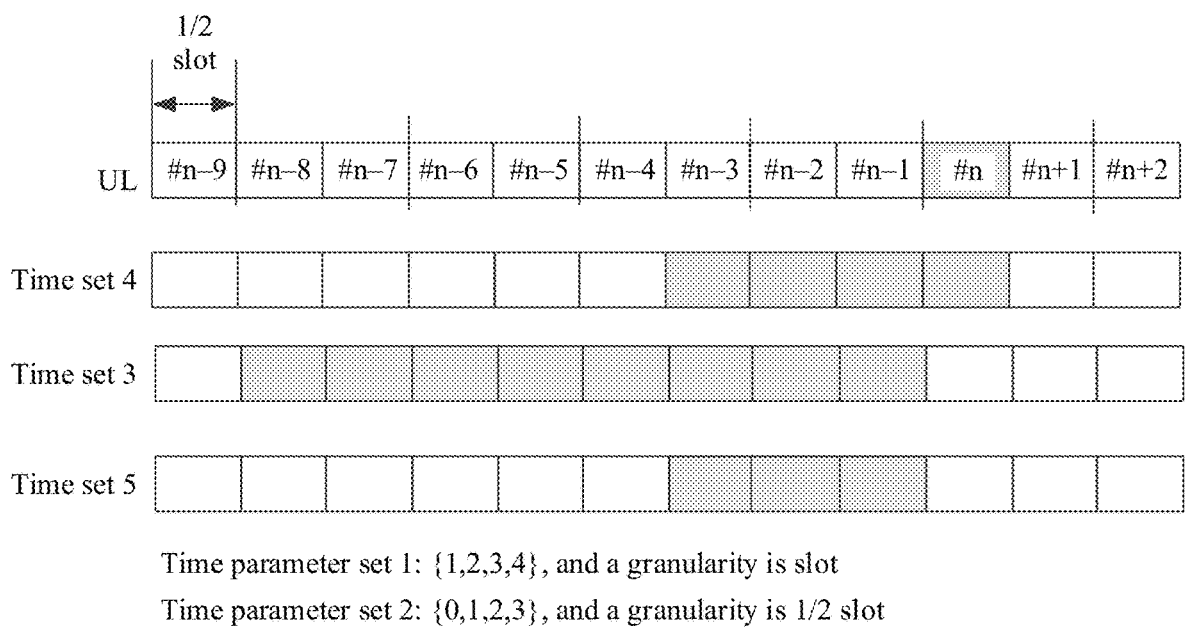
FIG. 17 is a schematic diagram of another manner of determining a target time.

For example, it is assumed that N is 2, and two time parameter sets are separately a time parameter set 1 and a time parameter set 2. The time parameter set 1 is {1, 2, 3, 4}, and a corresponding time unit length is a slot. The time parameter set 2 is {0, 1, 2, 3}, and a corresponding time unit length is ½ slot. In this case, it is determined that the two target time parameter sets are the time parameter set 1 and the time parameter set 2. The first time is a time corresponding to a ½ slot numbered n. As shown in FIG. 16, first, according to the foregoing method, the time unit length corresponding to the time parameter set 1 is converted into ½ slot, to obtain a converted time parameter set 1 that is {1, 2, 3, 4, 5, 6, 7, 8}. Next, 1, 2, 3, 4, 5, 6, 7, and 8 ½ slots are counted backward from a ½ slot numbered n, to obtain a time set 3 that corresponds to the time parameter set 1 and that includes ½ slots numbered {n−1, n−2, n−3, n−4, n−5, n−6, n−7, n−8}. Similarly, {0, 1, 2, 3} time units are counted backward from a ½ slot numbered n based on the time parameter set 2, to obtain a time set 4 that corresponds to the time parameter set 2 and that includes ½ slots numbered {n, n−1, n−2, n−3}. Then, a union set of the time set 3 and the time set 4 is obtained, to obtain a combined time set 5 including ½ slots numbered {n, n−1, n−2, n−3, n−4, n−5, n−6, n−7, n−8}. The M target times are times corresponding to all time units in the time set 5. In other words, the time units corresponding to the M target times are ½ slots numbered n, n−1, n−2, n−3, n−4, n−5, n−6, n−7, and n−8. Alternatively, as shown in FIG. 17, an intersection set of the time set 3 and the time set 4 is obtained, to obtain a combined time set 5 including ½ slots numbered {n−1, n−2, n−3}. The M target times are times corresponding to all time units in the time set 5. In other words, the time unit corresponding to the M target times are ½ slots numbered n−1, n−2, and n−3.

Alternatively, according to the foregoing method, a method of determining the M target time units after the time parameter set 1 is converted into ½ slot to obtain a converted time parameter set 1 that is {2, 4, 6, 8} is similar to the foregoing method. Details are not described again.

S303: The terminal device sends a codebook at the first time.

Optionally, after determining the M target times according to the method described in S302, the terminal device generates the codebook based on response information corresponding to downlink information received at at least one of the M target times. For example, the codebook includes the response information corresponding to the downlink information received at the at least one of the M target times. Then, the terminal device sends the generated codebook to the network device at the first time.

For a specific process of generating the codebook, refer to S102. Details are not described again.

S304: The network device receives the codebook at the first time.

After receiving the codebook from the terminal device at the first time, the network device determines the N target time parameter sets, and determines the M target times based on the first time and the N target time parameter sets. In this way, it can be determined that the response information included in the codebook is response information corresponding to downlink information received at which target time in the M target times, to determine target time points at which the downlink information is successfully received at the M target times, and target time points at which the downlink information is not successfully received at the M target times.

A specific process in which the network device determines the N target time parameter sets and determines the M target times based on the N target time parameter sets and the first time is the same as that of the terminal device. Details are not described herein again.

According to the communication method provided in this embodiment of this application, the terminal device determines the N target time parameter sets based on the N time parameter sets, and determines the M target times based on the N determined target time parameter set and the first time, to accurately determine the target time.

Figure 18:
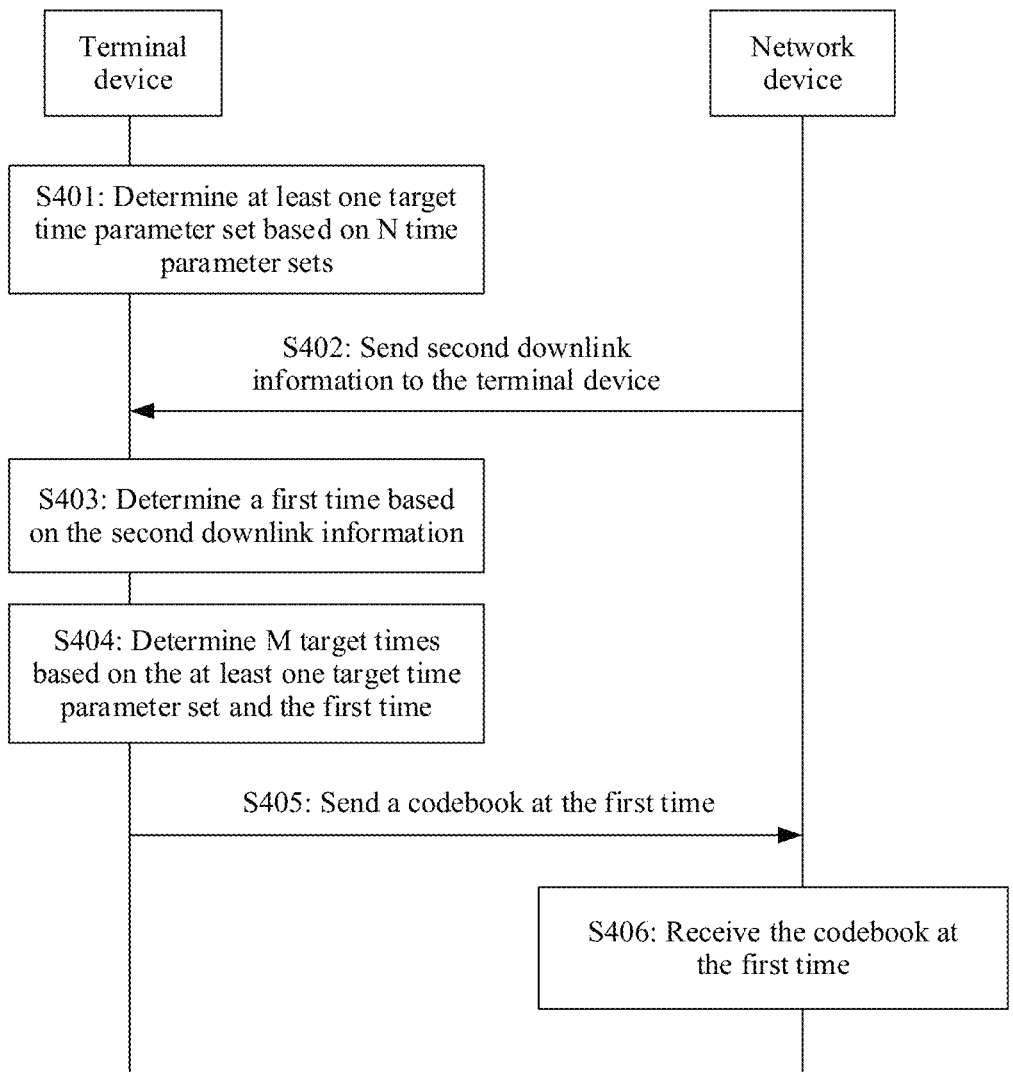
FIG. 18 is a flowchart of a communication method according to an embodiment of this application.

FIG. 18 is a flowchart of a communication method according to an embodiment of this application. Based on the foregoing embodiments, as shown in FIG. 18, the method according to this embodiment of this application includes the following steps.

S401: The terminal device determines at least one target time parameter set based on the N time parameter sets.

In this embodiment of this application, the terminal device can determine the at least one target time parameter set according to the method in S201 or the method in S301. For a specific process of determining the at least one target time parameter set, refer to S201 or S301. Details are not described herein again.

S402: The network device sends second downlink information to the terminal device.

The second downlink information is used to indicate the first time.

S403: The terminal device determines the first time based on the second downlink information.

After receiving the second downlink information, the terminal device determines a value of k based on the second downlink information, and response information corresponding to the first downlink information sent by the terminal device to the network device meets a timing relationship of n+k. n represents a time unit in which the terminal device receives the first downlink information, and k represents a quantity of time units between receiving the first downlink information by the terminal device and feeding back, by the terminal device to the network device, the response information corresponding to the first downlink information. For example, as shown in FIG. 2, the terminal device receives the first downlink information in the $n^{th}$ slot. If the second downlink information is used to indicate that k=4, the terminal device feeds back the response information of the first downlink information to the network device in the $(n+4)^{th}$ slot.

The second downlink information may be carried in DCI. For example, the DCI indicates that a time parameter in a time parameter set is used as k for the terminal device. The time parameter set may be configured by the network device, or may be predefined, that is, specified in a protocol. There may be a plurality of types of DCI formats used for downlink information scheduling. For example, there are two types of DCI formats: a first DCI format and a second DCI format. In an example, for the first DCI format, it is assumed that a time parameter set 1 specified in a protocol is {1, 2, 3, 4, 5, 6, 7, 8}. When the downlink information is scheduled by using the first DCI format, a value in the time parameter set 1 may be indicated to be used as k. In another example, for the second DCI format, it is assumed that the network device configures the time parameter set. When the second downlink information is scheduled by using the second DCI format, a value in the time parameter set 2 may be indicated to be used as k.

In this way, the terminal device can determine the first time based on the received second downlink information.

S404: The terminal device determines M target times based on the at least one target time parameter set and the first time.

In this embodiment of this application, the terminal device may determine the M target times according to the method in S202 or the method in S302. To be specific, when the method in S201 is used in S401 in this embodiment of this application to determine the target time parameter set, the manner in S202 is used in S404 to determine the M target times; when the method in S301 is used in S401 in this embodiment of this application to determine the N target time parameter sets, the manner in S302 is used in S404 to determine the M target times. For a specific process, refer to S202 or S302. Details are not described herein again.

S405: The terminal device sends a codebook at the first time.

After determining the M target times according to S404, the terminal device generates the codebook based on response information corresponding to downlink information received at at least one of the M target times. For example, the codebook includes the response information corresponding to the downlink information received at the at least one of the M target times. Then, the terminal device sends the generated codebook to the network device at the first time.

For a specific process of generating the codebook, refer to S102. Details are not described again.

S406: The network device receives the codebook at the first time.

After receiving the codebook from the terminal device at the first time, the network device determines the target time parameter set, and determines the M target times based on the first time and the target time parameter set. In this way, it can be determined that the response information included in the codebook is response information corresponding to downlink information received at which target time in the M target times, to determine target time points at which the downlink information is successfully received at the M target times, and target time points at which the downlink information is not successfully received at the M target times.

A specific process in which the network device determines the target time parameter set and determines the M target times based on the target time parameter set and the first time is the same as that of the terminal device. Details are not described herein again.

According to the communication method provided in this embodiment of this application, before determining the M target times based on the at least one target time parameter set and the first time, the terminal device first receives the second downlink information from the network device. The second downlink information is used to indicate the first time. In this way, the terminal device can determine the first time based on the second downlink information, and can further accurately determine the M target times based on the first time and the at least one target time parameter set.

Figure 19:
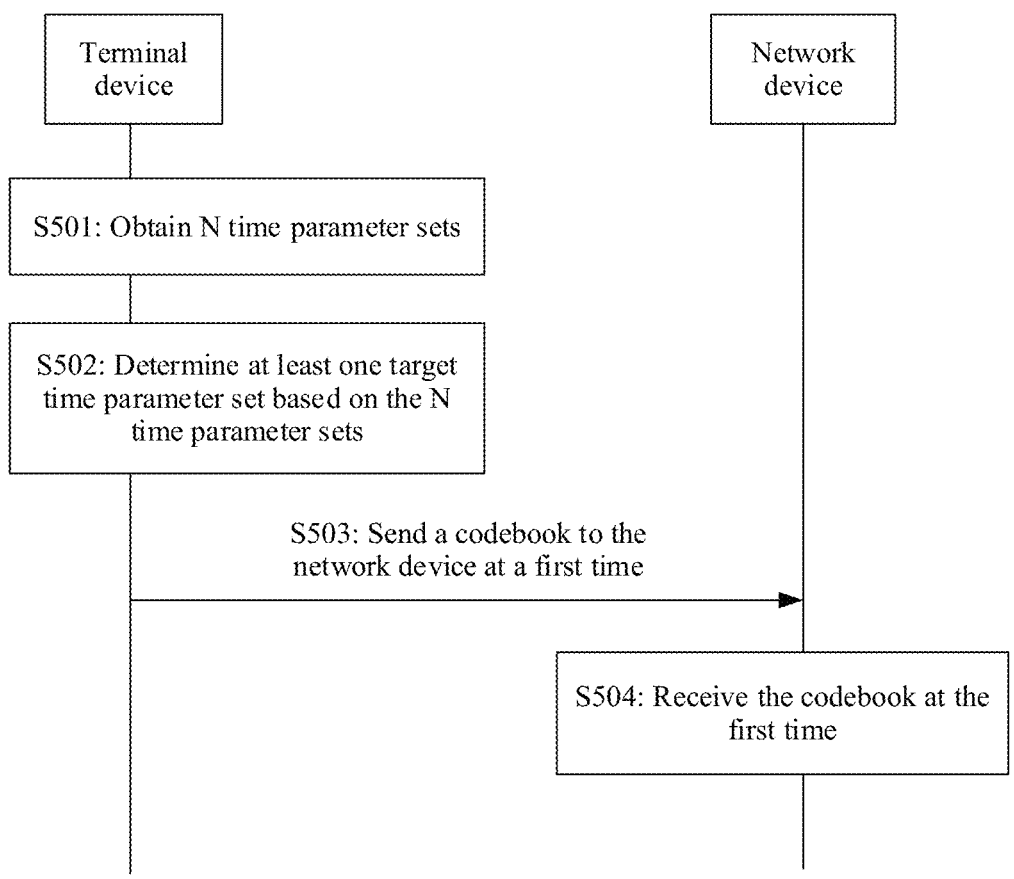
FIG. 19 is a flowchart of a communication method according to an embodiment of this application.

FIG. 19 is a flowchart of a communication method according to an embodiment of this application. Based on the foregoing embodiments, as shown in FIG. 19, the method according to this embodiment of this application includes the following steps.

S501: The terminal device obtains the N time parameter sets.

According to this embodiment of this application, the terminal device first needs to obtain the N time parameter sets, to determine the at least one target time parameter set based on the N time parameter sets. A manner in which the terminal device obtains the N time parameter sets include but is not limited to the following examples.

In a first example, the network device determines the N time parameter sets. Subsequently, the network device sends first configuration information to the terminal device. The first configuration information is used to indicate the N time parameter sets. Then the terminal device obtains the N time parameter sets based on the first configuration information.

In this example, all the N time parameter sets are configured by the network device. For example, the network device determines the N time parameter sets. To ensure that the N time parameter sets of the terminal device are consistent with the N time parameter sets of the network device, the network device sends the first configuration information to the terminal device, and the first configuration information is used to indicate the N time parameter sets determined by the network device. The first configuration information may be carried in DCI, or may be carried in higher layer signaling.

In a second example, the network device determines the N time parameter sets. The N time parameter sets include N1 time parameter sets and N2 time parameter sets, the N2 time parameter sets are predefined, a sum of N1 and N2 is N, and N1 and N2 are both positive integers. The N1 time parameter sets are determined by the network device. For example, the N1 time parameter sets may be determined based on a scheduling requirement. This is not limited in this embodiment of this application. Then, the network device sends second configuration information to the terminal device, and the second configuration information is used to indicate the N1 time parameter sets. The terminal device obtains the N time parameter sets based on the N1 time parameter sets and the N2 time parameter sets.

In other words, in this example, in the N time parameter sets, the N1 time parameter sets are determined by the network device, and the N2 time parameter sets are predefined. In this case, for the network device, the network device determines the N1 time parameter sets, determines the N2 time parameter sets based on a predefined specification, and further obtains the N time parameter sets.

To ensure that the N time parameter sets of the terminal device are consistent with the N time parameter sets of the network device, the network device notifies the terminal device of the N1 time parameter sets determined by the network device. To be specific, the network device sends the second configuration information to the terminal device, and the second configuration information is used to indicate the N1 time parameter sets determined by the network device. The second configuration information may be carried in DCI, or may be carried in higher layer signaling.

In this way, the terminal device can determine the N1 time parameter sets based on the second configuration information sent by the network device, determine the N2 time parameter sets based on predefined specification, and further combine the N1 time parameter sets and the N2 time parameter sets. That is, the N1 time parameter sets and the N2 time parameter sets are combined, to obtain the N time parameter sets. For example, N1 is 2, N2 is 3, and the obtained N time parameter sets are five time parameter sets.

In this way, the terminal device can obtain the N time parameter sets according to a manner 1 described in the first example or a manner 2 described in the second example, thereby ensuring consistency of the N time parameter sets between the network device and the terminal device.

S502: The terminal device determines at least one target time parameter set based on the N time parameter sets.

In this embodiment of this application, the terminal device can determine the at least one target time parameter set according to the method in S201 or the method in S301. For a specific process of determining the at least one target time parameter set, refer to S201 or S301. Details are not described herein again.

S503: The terminal device sends a codebook to the network device at a first time.

After obtaining the at least one target time parameter set according to the foregoing steps, the terminal device determines the M target times based on the at least one target time parameter set and the first time. For a specific process, refer to the method of determining the M target times in S202 or in S302. To be specific, when the method in S201 is used in S502 in this embodiment of this application to determine the target time parameter set, the manner in S202 is used in S503 to determine the M target times; when the method in S301 is used in S502 in this embodiment of this application to determine the N target time parameter sets, the manner in S302 is used in S503 to determine the M target times.

Then, the response information corresponding to the downlink information received at the at least one of the M target times is included in the codebook, and is sent to the network device.

S504: The network device receives the codebook at the first time.

After receiving the codebook from the terminal device at the first time, the network device determines the target time parameter set, and determines the M target times based on the first time and the target time parameter set. In this way, it can be determined that the response information included in the codebook is response information corresponding to downlink information received at which target time in the M target times, to determine target time points at which the downlink information is successfully received at the M target times, and target time points at which the downlink information is not successfully received at the M target times.

A specific process in which the network device determines the target time parameter set and determines the M target times based on the target time parameter set and the first time is the same as that of the terminal device. Details are not described herein again.

According to the communication method provided in this embodiment of this application, the network device determines the N time parameter sets and sends the first configuration information or the second configuration information to the terminal device. In this way, the terminal device can obtain the N time parameter sets based on the first configuration information or the second configuration information, thereby ensuring consistency of the N time parameter sets between the network device and the terminal device.

Figure 20:
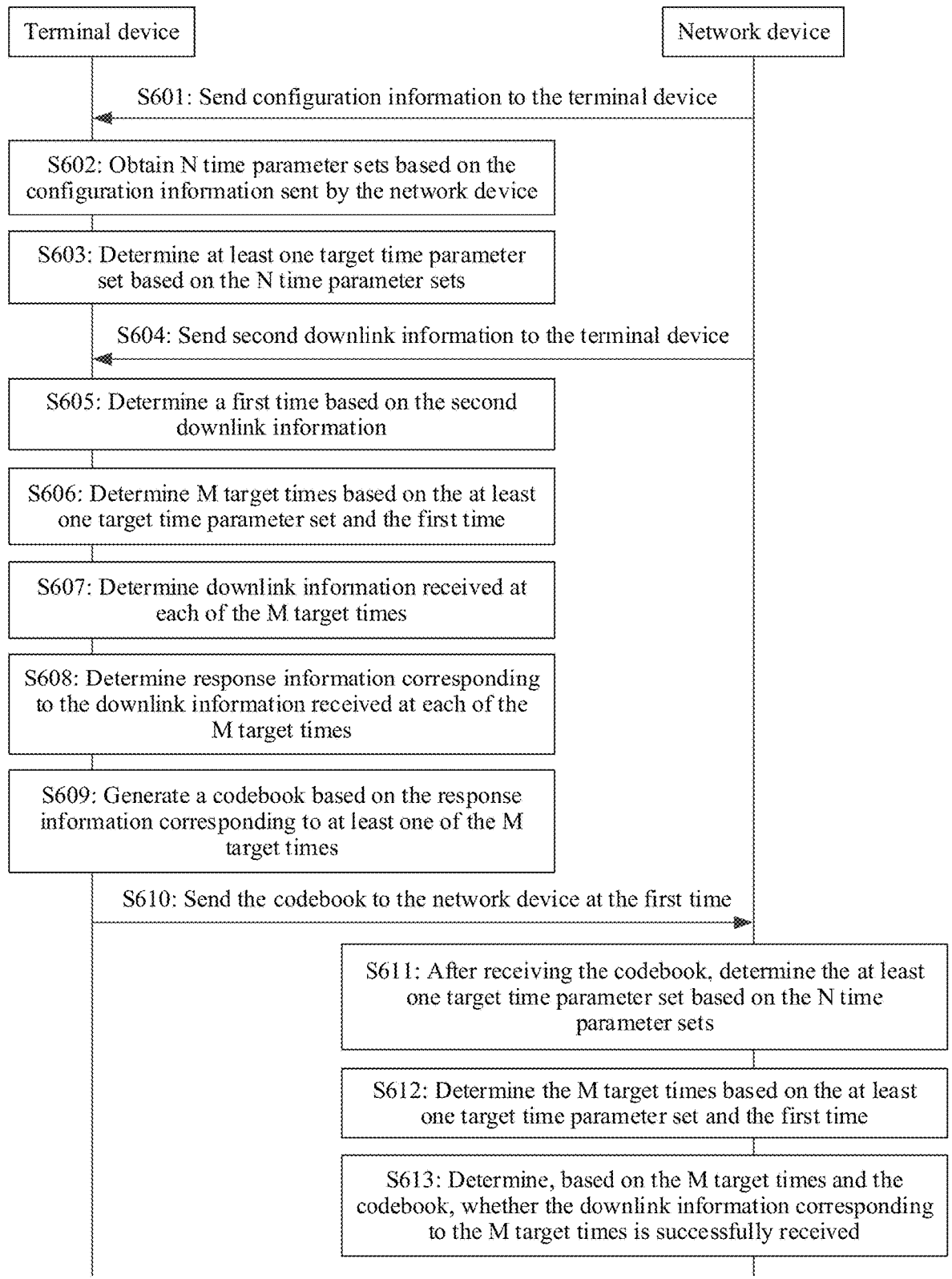
FIG. 20 is a flowchart of a communication method according to an embodiment of this application.

FIG. 20 is a flowchart of a communication method according to an embodiment of this application. Based on the foregoing embodiments, as shown in FIG. 20, the method according to this embodiment of this application includes the following steps.

S601: The network device sends configuration information to the terminal device.

Referring to S501, the configuration information may be the first configuration information used to indicate the N time parameter sets, or may be the second configuration information used to indicate the N1 time parameter sets.

S602: The terminal device obtains the N time parameter sets based on the configuration information sent by the network device.

For details, refer to S501. For example, when the configuration information in S601 is the first configuration information, the N time parameter sets are obtained in the manner in the first example; when the configuration information in S601 is the second configuration information, the N time parameter sets are obtained in the manner in the second example. Specifically, refer to the description in S501. Details are not described herein again.

S603: The terminal device determines at least one target time parameter set based on the N time parameter sets.

In this embodiment of this application, the terminal device can determine the at least one target time parameter set according to the method in S201 or the method in S301. For a specific process of determining the at least one target time parameter set, refer to S201 or S301. Details are not described herein again.

S604: The network device sends second downlink information to the terminal device.

The second downlink information is used to indicate the first time.

S605: The terminal device determines the first time based on the second downlink information.

Specifically, refer to the description in S401 and S403. Details are not described herein again.

It should be noted that a sequence of S604 and S601 is not limited. To be specific, S604 and S605 may be performed before S601 and S602, or may be performed after S601 and S602. This is not limited in this embodiment of this application.

S606: The terminal device determines M target times based on the at least one target time parameter set and the first time.

For a specific process of determining the M target times, refer to the method in S202 or the method in S302. To be specific, when the method in S201 is used in S603 in this embodiment of this application to determine the target time parameter set, the manner in S202 is used in S606 to determine the M target times; when the method in S301 is used in S603 in this embodiment of this application to determine the N target time parameter sets, the manner in S302 is used in S606 to determine the M target times. Details are not described herein again.

S607: The terminal device determines downlink information received at each of the M target times.

S608: The terminal device determines response information corresponding to the downlink information received at each of the M target times.

S609: The terminal device generates a codebook based on the response information corresponding to at least one of the M target times.

For S607 to S609, refer to the descriptions of the embodiments shown in FIG. 4, FIG. 5, or FIG. 6. Details are not described herein again.

S610: The terminal device sends the codebook to the network device at a first time.

S611: After receiving the codebook, the network device determines at least one target time parameter set based on the N time parameter sets.

A process in which the network device determines the at least one target time parameter set based on the N time parameter sets is the same as a process in which the terminal device determines the at least one target time parameter set based on the N time parameter sets. Details are not described herein again.

S612: The network device determines the M target times based on the at least one target time parameter set and the first time.

A process in which the network device determines the M target times based on the at least one target time parameter set and the first time is the same as a process in which the terminal device determines the M target times based on the at least one target time parameter set and the first time. Specifically, refer to the description in S606. Details are not described herein again.

S613: The network device determines, based on the M target times and the codebook, whether downlink information corresponding to the M target times is successfully received.

After receiving the codebook, the network device determines the at least one target time parameter set based on the N time parameter sets, and determines the M target times based on the determined at least one target time parameter set and the first time. Then, the network device parses the codebook, and determines, based on the response information carried in the codebook, whether the downlink information corresponding to the M target times is successfully received, to improve reliability of sending the downlink information.

According to the communication method provided in this embodiment of this application, the network device sends the first configuration information or the second configuration information to the terminal device, the terminal device obtains the N time parameter sets based on the first configuration information or the second configuration information, and then determines the at least one target time parameter set based on the N time parameter sets. The network device sends the second downlink information to the terminal device. The terminal device determines the first time based on the second downlink information. Then, the terminal device determines the M target times based on the first time and the at least one target time parameter set, and sends the codebook to the network device at the first time. After receiving the codebook at the first time, the network device also determines the at least one target time parameter set based on the N time parameter sets, determines the M target times based on the at least one target time parameter set and the first time, and further determines, based on the response information and the codebook that are of the downlink information corresponding to the M target times, whether the downlink information corresponding to the M target times are successfully received. In other words, according to the embodiments of this application, when the time unit lengths corresponding to the at least two of the N time parameter sets are different, the terminal device can effectively generate the codebook, and the network device can effectively parse the codebook. In this way, it is ensured that the network device and the terminal device have a consistent understanding of the codebook, thereby ensuring communication effectiveness and improving resource utilization.

Figure 21:
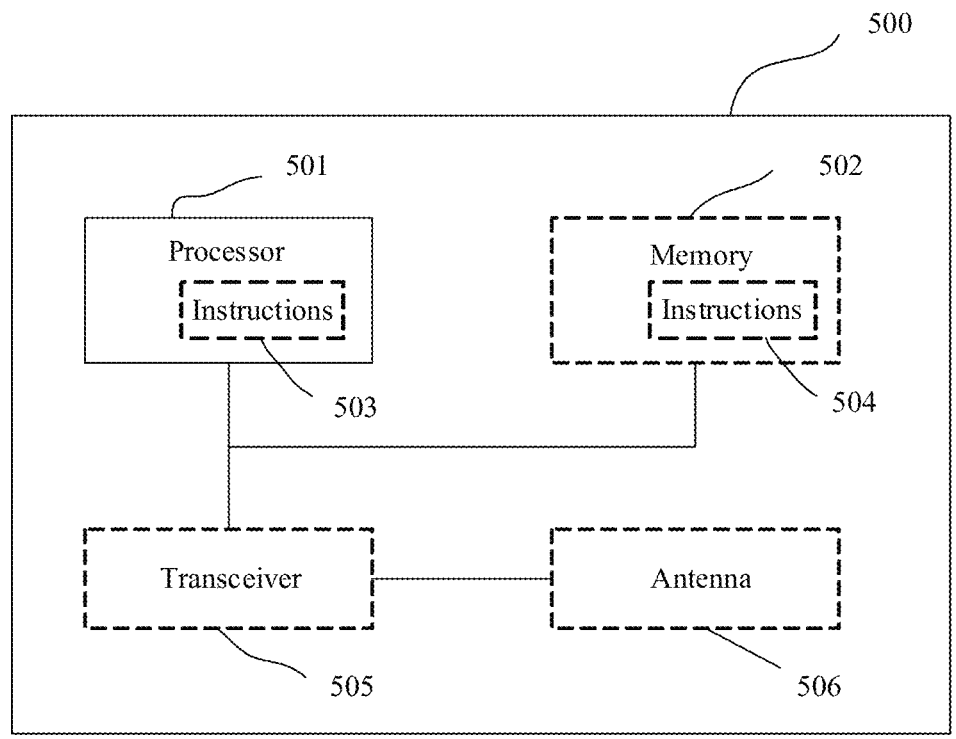
FIG. 21 is a schematic structural diagram of a communications device according to an embodiment of this application.

FIG. 21 is a schematic structural diagram of a communications device according to an embodiment of this application. As shown in FIG. 21, the communications device 500 in this embodiment may be the terminal device (or a component that can be used in the terminal device) or the network device (or a component that can be used in the network device) mentioned in the foregoing method embodiments. The communications device may be configured to implement the method that corresponds to the terminal device or the network device and that is described in the foregoing method embodiments. For details, refer to descriptions in the foregoing method embodiments.

The communications device 500 may include one or more processors 501. The processor 501 may also be referred to as a processing unit, and may implement a specific controlling or processing function. The processor 501 may be a general-purpose processor, a dedicated processor, or the like. For example, the processor 501 may be a baseband processor or a central processing unit. The baseband processor may be configured to process a communications protocol and communications data. The central processing unit may be configured to control the communications device, execute a software program, and process data of the software program.

In a possible design, the processor 501 may also store instructions 503 or data (for example, intermediate data). The instructions 503 may be run by the processor, so that the communications device 500 performs the method that corresponds to the terminal device or the network device and that is described in the foregoing method embodiments.

In another possible design, the communications device 500 may include a circuit, and the circuit may implement a sending, receiving, or communication function in the foregoing method embodiments.

Optionally, the communications device 500 may include one or more memories 502, where instructions 504 may be stored in the memory 502, and the instructions may be run on the processor, so that the communications device 500 performs the method described in the foregoing method embodiments.

Optionally, the processor 501 and the memory 502 may be disposed separately or may be integrated together.

Optionally, the communications device 500 may further include a transceiver 505 and/or an antenna 506. The processor 501 may be referred to as a processing unit, and controls the communications device (for example, the terminal device or the network device). The transceiver 505 may be referred to as a transceiver unit, a transceiver machine, a transceiver circuit, a transceiver, or the like, and is configured to implement a transceiver function of the communications device.

In a design, when the communications device 500 is configured to implement operations corresponding to the terminal device in the foregoing embodiments, for example, the processor 501 may determine at least one target time parameter set based on N time parameter sets, where N is a positive integer greater than or equal to 2, time unit lengths corresponding to at least two of the N time parameter sets are different, each time parameter set includes at least one time parameter, and the time parameter is used to indicate a quantity of time units between receiving first downlink information and feeding back first response information corresponding to the first downlink information. The transceiver 505 is configured to send a codebook at a first time, where the codebook includes response information corresponding to downlink information received at at least one of M target times, the M target times are determined based on the first time and the at least one target time parameter set, and M is a positive integer.

For specific implementation processes of the transceiver 505 and the processor 501, refer to related descriptions in the foregoing embodiments. Details are not described herein again.

In another design, when the communications device is configured to implement operations corresponding to the network device in the foregoing embodiments, for example, the transceiver 505 may receive a codebook at a first time, where the codebook includes response information corresponding to downlink information received at at least one of M target times, M is a positive integer, the M target times are determined based on the first time and at least one target time parameter set, the at least one target time parameter set is determined based on N time parameter sets, N is a positive integer greater than or equal to 2, time unit lengths corresponding to at least two of the N time parameter sets are different, each time parameter set includes at least one time parameter, and the time parameter is used to indicate a quantity of time units between sending first downlink information and receiving first response information corresponding to the first downlink information.

For specific implementation processes of the transceiver 505 and the processor 501, refer to related descriptions in the foregoing embodiments. Details are not described herein again.

The processor 501 and the transceiver 505 that are described in this application may be implemented on an integrated circuit (IC), an analog IC, a radio frequency integrated circuit (RFIC), a mixed signal IC, an application-specific integrated circuit (ASIC), a printed circuit board (PCB), an electronic device, or the like. The processor 501 and the transceiver 505 may alternatively be manufactured by using various IC technologies, for example, a complementary metal oxide semiconductor (CMOS), an n-type metal oxide semiconductor (NMOS), a p-channel metal oxide semiconductor (PMOS), a bipolar junction transistor (BJT), a bipolar CMOS (BiCMOS), silicon germanium (SiGe), and gallium arsenide (GaAs).

Although in the descriptions of the foregoing embodiment, the communications device 500 is described by using the terminal or the network device as an example, a range of the communications device described in this application is not limited to the terminal device or the network device, and a structure of the communications device may not be limited by FIG. 21.

The communications device in this embodiment of this application may be configured to perform the technical solutions performed by the terminal device (or the network device) in the foregoing method embodiments. Implementation principles and technical effects thereof are similar, and details are not described herein again.

Figure 22:
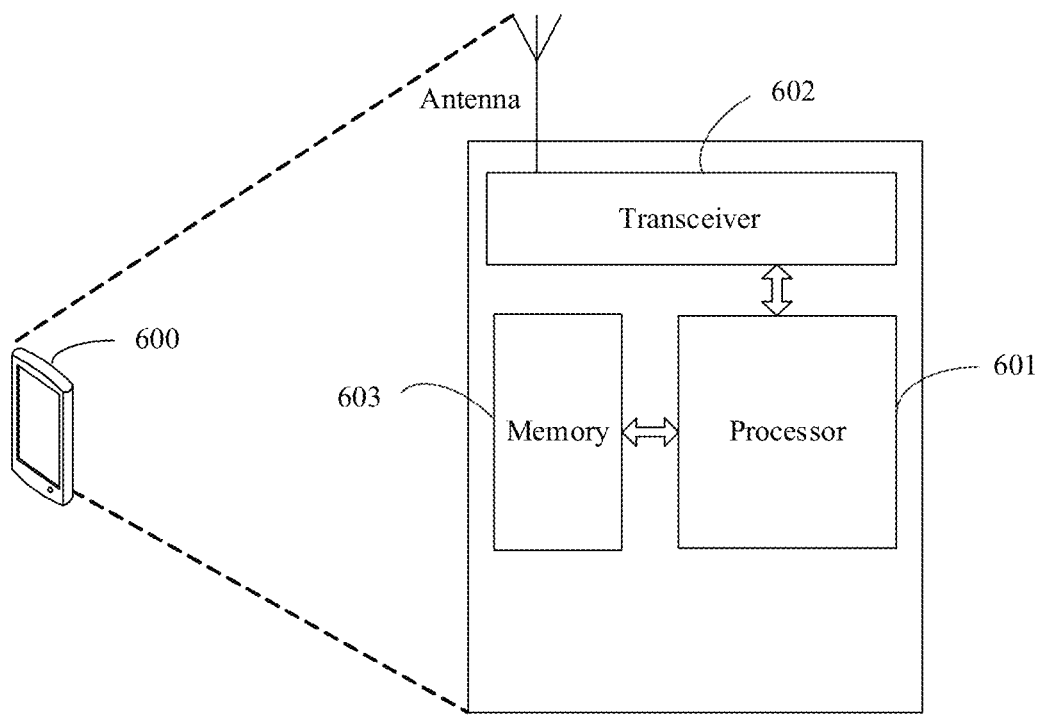
FIG. 22 is a schematic structural diagram of a terminal device according to an embodiment of this application.

FIG. 22 is a schematic structural diagram of a terminal device according to an embodiment of this application. The terminal device 600 may implement functions performed by the terminal device in the foregoing method embodiments. The functions may be implemented by hardware, or may be implemented by hardware by executing corresponding software. The hardware or software includes one or more modules or units corresponding to the foregoing functions.

In a possible design, a structure of the terminal device 600 includes a processor 601, a transceiver 602, and a memory 603. The processor 601 is configured to support the terminal device 600 in performing corresponding functions in the foregoing methods. The transceiver 602 is configured to support communication between the terminal device 600 and another terminal device or a network device. The terminal device 600 may further include the memory 603. The memory 603 is configured to be coupled to the processor 601, and stores program instructions and data that are necessary for the terminal device 600.

After the terminal device 600 is powered on, the processor 601 may read the program instructions and the data in the memory 603, interpret and execute the program instructions, and process data of the program instructions. When data is to be sent, after performing baseband processing on the to-be-sent data, the processor 601 outputs a baseband signal to the transceiver 602. After performing radio frequency processing on the baseband signal, the transceiver 602 sends a radio frequency signal in a form of an electromagnetic wave through an antenna. When data is sent to the terminal, the transceiver 602 receives a radio frequency signal through the antenna, converts the radio frequency signal into a baseband signal, and outputs the baseband signal to the processor 601. The processor 601 converts the baseband signal into data and processes the data.

A person skilled in the art may understand that, for ease of description, FIG. 22 shows only one memory 603 and one processor 601. In an actual terminal device 600, there may be a plurality of processors 601 and a plurality of memories 603. The memory 603 may also be referred to as a storage medium, a storage device, or the like. This is not limited in this embodiment of this application.

The terminal device in this embodiment of this application may be configured to perform the technical solutions performed by the terminal device in the foregoing method embodiments. Implementation principles and technical effects thereof are similar, and details are not described herein again.

Figure 23:
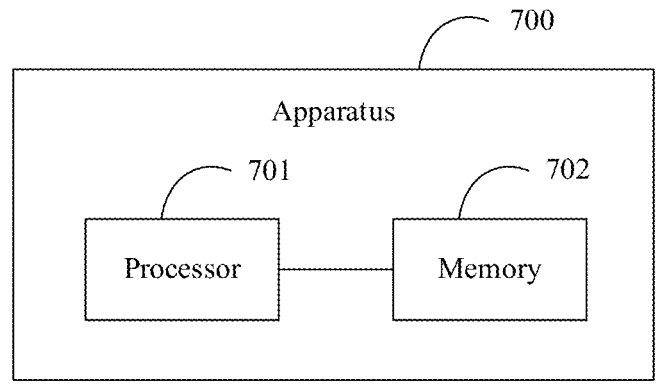
FIG. 23 is a schematic structural diagram of an apparatus according to an embodiment of this application.

FIG. 23 is a schematic structural diagram of an apparatus according to an embodiment of this application. The apparatus 700 exists in a product form of a chip. A structure of the apparatus includes a processor 701 and a memory 702. The memory 702 is configured to be coupled to the processor 701. The memory 702 stores program instructions and data that are necessary for the apparatus. The processor 701 is configured to execute the program instructions stored in the memory 702, so that the apparatus performs functions of the terminal device in the foregoing method embodiments.

The apparatus in this embodiment of this application may be configured to perform the technical solutions performed by the terminal device in the foregoing method embodiments. Implementation principles and technical effects thereof are similar, and details are not described herein again.

Figure 24:
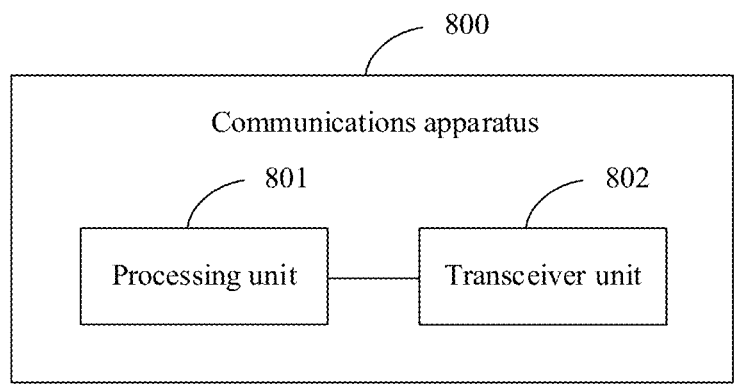
FIG. 24 is a schematic structural diagram of a communications apparatus according to an embodiment of this application.

FIG. 24 is a schematic structural diagram of a communications apparatus according to an embodiment of this application. The communications apparatus may be a terminal device, or may be a component (for example, an integrated circuit or a chip) of a terminal device. As shown in FIG. 24, the communications apparatus 800 may include a processing unit 801 and a transceiver unit 802.

The processing unit 801 is configured to determine at least one target time parameter set based on N time parameter sets, where N is a positive integer greater than or equal to 2, time unit lengths corresponding to at least two of the N time parameter sets are different, each time parameter set includes at least one time parameter, and the time parameter is used to indicate a quantity of time units between receiving first downlink information and feeding back first response information corresponding to the first downlink information.

The transceiver unit 802 is configured to send a codebook at a first time, where the codebook includes response information corresponding to downlink information received at at least one of M target times, the M target times are determined based on the first time and the at least one target time parameter set, and M is a positive integer.

Optionally, each of the N time parameter sets corresponds to a DCI format, and DCI formats corresponding to the at least two of the N time parameter sets are different.

Optionally, the processing unit 801 is specifically configured to determine one of the N time parameter sets as the target time parameter set.

Optionally, the processing unit 801 is specifically configured to use, as the target time parameter set, a time parameter set predefined in the N time parameter sets that corresponds to a time unit length of a predefined value and/or a predefined DCI format.

Optionally, the processing unit 801 is specifically configured to use, as the target time parameter set, a time parameter set that is an intersection set or a union set of the N time parameter sets.

Optionally, the processing unit 801 is specifically configured to: obtain an intersection set or a union set of time parameter sets that are in the N time parameter sets and that correspond to a same DCI format, to obtain at least two combined time parameter sets; and use one of the at least two combined time parameter sets as the target time parameter set.

Optionally, the processing unit 801 is specifically configured to: use each of the N time parameter sets as the target time parameter set, to obtain N target time parameter sets; determine a time set corresponding to each target time parameter set based on the first time and each of the N target time parameter sets, to obtain N time sets; and obtain an intersection set or a union set of the N time sets, to obtain the M target times.

The communications apparatus in this embodiment of this application may be configured to perform the technical solutions performed by the terminal device in the foregoing method embodiments. Implementation principles and technical effects thereof are similar, and details are not described herein again.

Figure 25:
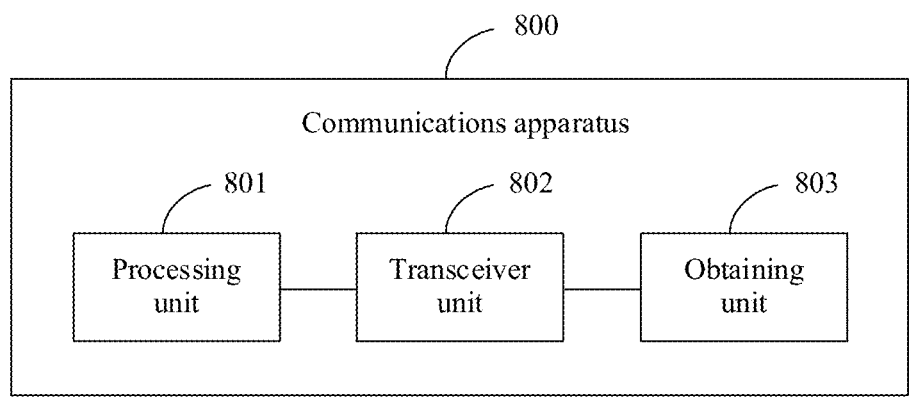
FIG. 25 is a schematic structural diagram of a communications apparatus according to an embodiment of this application.

FIG. 25 is a schematic structural diagram of a communications apparatus according to an embodiment of this application. Based on the foregoing embodiments, as shown in FIG. 25, the communications apparatus according to this embodiment of this application further includes an obtaining unit 803, where the transceiver unit 802 is further configured to receive first configuration information, where the first configuration information is used to indicate the N time parameter sets; and the obtaining unit 803 is configured to obtain the N time parameter sets based on the first configuration information;

or the transceiver unit 802 is further configured to receive second configuration information, where the second configuration information is used to indicate N1 time parameter sets; and the obtaining unit 803 is configured to obtain the N time parameter sets based on the N1 time parameter sets and N2 time parameter sets, where the N2 time parameter sets are predefined, the N time parameter sets include the N1 time parameter sets and the N2 time parameter sets, a sum of N1 and N2 is N, and N1 and N2 are both positive integers.

The communications apparatus in this embodiment of this application may be configured to perform the technical solutions performed by the terminal device in the foregoing method embodiments. Implementation principles and technical effects thereof are similar, and details are not described herein again.

Figure 26:
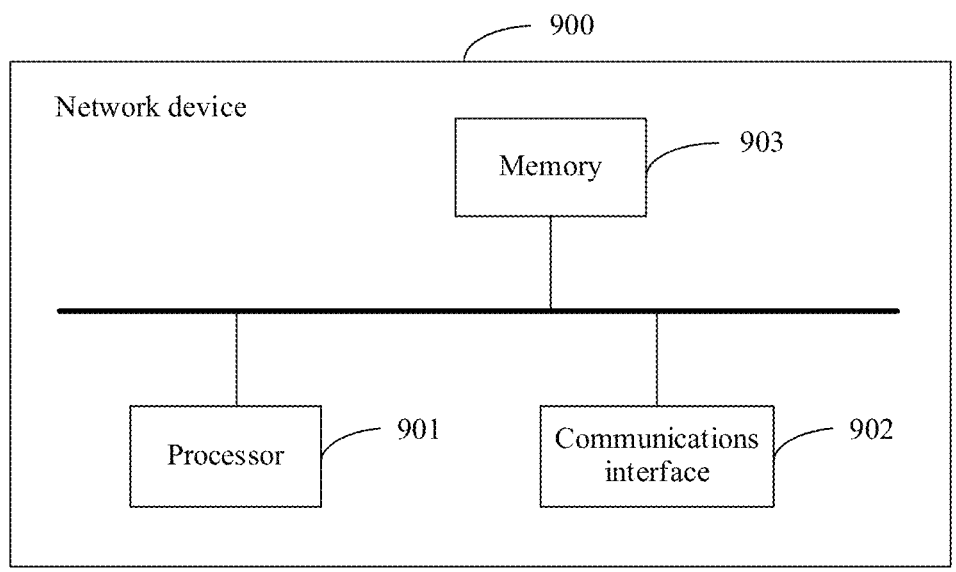
FIG. 26 is a schematic structural diagram of a network device according to an embodiment of this application.

FIG. 26 is a schematic structural diagram of a network device 900 according to an embodiment of this application. The network device 900 may implement functions performed by the network device in the foregoing method embodiments. The functions may be implemented by hardware, or may be implemented by hardware by executing corresponding software. The hardware or software includes one or more modules or units corresponding to the foregoing functions.

In a possible design, a structure of the network device 900 includes a processor 901 and a communications interface 902, and the processor 901 is configured to support the network device 900 in performing corresponding functions in the foregoing methods. The communications interface 902 is configured to support communication between the network device 900 and another network element. The network device 900 may further include a memory 903. The memory 903 is configured to be coupled to the processor 901, and stores program instructions and data that are necessary for the network device 900.

A person skilled in the art may understand that, for ease of description, FIG. 26 shows only one memory 903 and one processor 901. In an actual network device 900, there may be a plurality of processors 901 and a plurality of memories 903. The memory 903 may also be referred to as a storage medium, a storage device, or the like. This is not limited in this embodiment of this application.

The network device in this embodiment of this application may be configured to perform the technical solutions performed by the network device in the foregoing method embodiments. Implementation principles and technical effects thereof are similar, and details are not described herein again.

Figure 27:
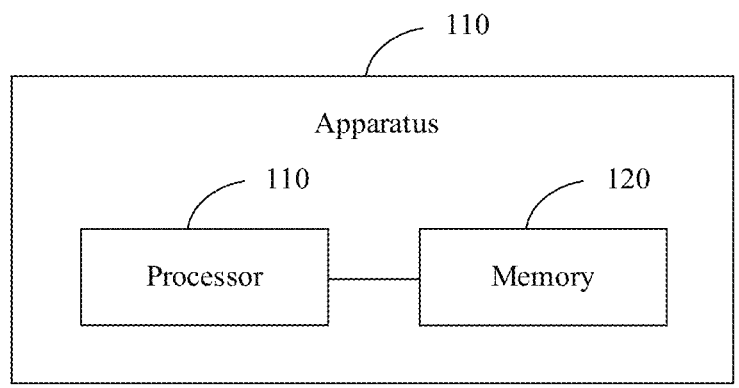
FIG. 27 is a schematic structural diagram of an apparatus according to an embodiment of this application.

FIG. 27 is a schematic structural diagram of an apparatus according to an embodiment of this application. The apparatus 100 exists in a product form of a chip. A structure of the apparatus includes a processor 110 and a memory 120. The memory 120 is configured to be coupled to the processor 110. The memory 120 stores program instructions and data that are necessary for the apparatus. The processor 110 is configured to execute the program instructions stored in the memory 120, so that the apparatus performs functions of the network device in the foregoing method embodiments.

The apparatus in this embodiment of this application may be configured to perform the technical solutions performed by the network device in the foregoing method embodiments. Implementation principles and technical effects thereof are similar, and details are not described herein again.

Figure 28:
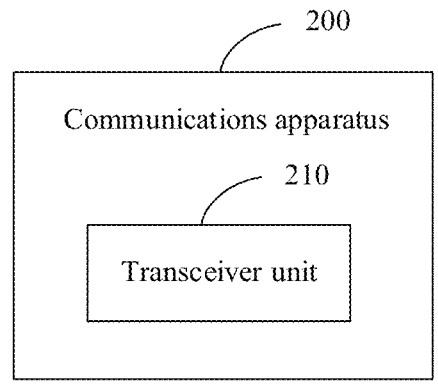
FIG. 28 is a schematic structural diagram of a communications apparatus according to an embodiment of this application.

FIG. 28 is a schematic structural diagram of a communications apparatus according to an embodiment of this application. The communications apparatus may be a network device, or may be a component (for example, an integrated circuit or a chip) of a network device. As shown in FIG. 28, the communications apparatus 200 may include a transceiver unit 210.

The transceiver unit 210 may implement the method on the network device side. For example, the transceiver unit 210 is configured to receive the codebook at the first time, where the codebook includes response information corresponding to downlink information received at at least one of M target times, M is a positive integer, the M target times are determined based on the first time and at least one target time parameter set, the at least one target time parameter set is determined based on N time parameter sets, N is a positive integer greater than or equal to 2, time unit lengths corresponding to at least two of the N time parameter sets are different, each time parameter set includes at least one time parameter, and the time parameter is used to indicate a quantity of time units between sending first downlink information and receiving first response information corresponding to the first downlink information.

Optionally, each of the N time parameter sets corresponds to a DCI format, and DCI formats corresponding to the at least two of the N time parameter sets are different.

Optionally, the at least one target time parameter set is one of the N time parameter sets.

Optionally the target time parameter set is a time parameter set predefined in the N time parameter sets that corresponds to a time unit length of a predefined value and/or a predefined DCI format.

Optionally, the at least one target time parameter set is a time parameter set that is an intersection set or a union set of the N time parameter sets.

Optionally, the at least one target time parameter set is one of at least two combined time parameter sets that is an intersection set or a union set of time parameter sets that are in the N time parameter sets and that correspond to a same DCI format.

Optionally, the at least one target time parameter set is N target time parameter sets. That is, each of the N target time parameter sets is each of the N time parameter sets.

Correspondingly, the M target times are an intersection set or a union set of N time sets, and the N time sets are determined based on the first time and each of the N target time parameter sets.

The communications apparatus in this embodiment of this application may be configured to perform the technical solutions performed by the network device in the foregoing method embodiments. Implementation principles and technical effects thereof are similar, and details are not described herein again.

Figure 29:
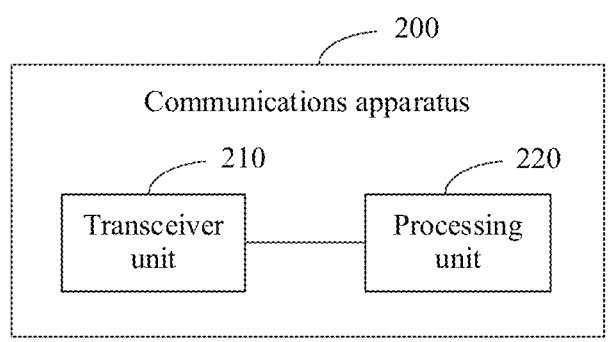
FIG. 29 is a schematic structural diagram of a communications apparatus according to an embodiment of this application.

FIG. 29 is a schematic structural diagram of a communications apparatus according to an embodiment of this application. Based on the foregoing embodiments, as shown in FIG. 29, the communications apparatus according to this embodiment of this application further includes a processing unit 220, where the processing unit 220 is configured to determine N time parameter sets; and
the transceiver unit 210 is further configured to send first configuration information, where the first configuration information is used to indicate the N time parameter sets;

or the processing unit 220 is configured to determine the N time parameter sets, where the N time parameter sets include N1 time parameter sets and N2 time parameter sets, the N2 time parameter sets are predefined, a sum of N1 and N2 is N, and N1 and N2 are both positive integers; and
the transceiver unit 210 is further configured to send second configuration information, where the second configuration information is used to indicate the N1 time parameter sets.

The communications apparatus in this embodiment of this application may be configured to perform the technical solutions performed by the network device in the foregoing method embodiments. Implementation principles and technical effects thereof are similar, and details are not described herein again.

Figure 30:
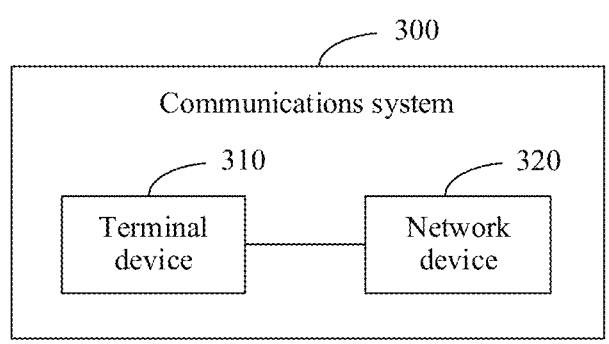
FIG. 30 is a schematic structural diagram of a communications system according to an embodiment of this application.

FIG. 30 is a schematic structural diagram of a communications system according to an embodiment of this application. As shown in FIG. 30, the communications system 300 in this embodiment of this application includes a terminal device 310 and a network device 320.

The terminal device 310 may be configured to implement functions of the terminal device in the foregoing method embodiments, and the network device 320 may be configured to implement functions on the network device side in the foregoing method embodiments. Implementation principles and technical effects thereof are similar, and details are not described herein again.

Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments. Details are not described herein again. In addition, mutual reference may also be made between the method embodiments and between the apparatus embodiments, and same or corresponding content in different embodiments may be cross-referenced. Details are not described herein again.

What is claimed is:

1. A communication method, comprising:
    determining at least one target time parameter set based on N time parameter sets, wherein N is a positive integer greater than or equal to 2, time unit lengths corresponding to at least two of the N time parameter sets are different, each time parameter set comprises at least one time parameter, and the at least one time parameter is used to indicate a quantity of time units between receiving first downlink information and feeding back first response information corresponding to the first downlink information; and
    sending a codebook at a first time, wherein the codebook comprises response information corresponding to downlink information received at at least one of M target times, the at least one of M target times are determined based on the first time and the at least one target time parameter set, and M is a positive integer.

2. The method according to claim 1, wherein each of the N time parameter sets corresponds to a downlink control information (DCI) format, and DCI formats corresponding to at least two of the N time parameter sets are different.

3. The method according to claim 2, wherein determining at least one target time parameter set based on N time parameter sets comprises:
    determining one of the N time parameter sets as the target time parameter set.

4. The method according to claim 3, wherein determining one of the N time parameter sets as the target time parameter set comprises:
    using, as the target time parameter set, a time parameter set in the N time parameter sets that corresponds to a time unit length of a predefined value or a predefined DCI format.

5. The method according to claim 2, wherein determining at least one target time parameter set based on N time parameter sets comprises:
    using, as the target time parameter set, a time parameter set that is an intersection set or a union set of the N time parameter sets.

6. The method according to claim 2, wherein determining at least one target time parameter set based on N time parameter sets comprises:
    obtaining an intersection set or a union set of time parameter sets that are in the N time parameter sets and that correspond to a same DCI format, to obtain at least two combined time parameter sets; and
    using one of the at least two combined time parameter sets as the target time parameter set.

7. The method according to claim 2, wherein determining at least one target time parameter set based on N time parameter sets comprises:
    using each of the N time parameter sets as the target time parameter set, to obtain N target time parameter sets; and
    determining the at least one of M target times based on the first time and the target time parameter set comprises:
    determining a time set corresponding to each target time parameter set based on the first time and each of the N target time parameter sets, to obtain N time sets; and
    obtaining an intersection set or a union set of the N time sets, to obtain the at least one of M target times.

8. The method according to claim 1, further comprising:
    receiving first configuration information, wherein the first configuration information is used to indicate the N time parameter sets; and obtaining the N time parameter sets based on the first configuration information; or
    receiving second configuration information, wherein the second configuration information is used to indicate N1 time parameter sets; and obtaining the N time parameter sets based on the N1 time parameter sets and N2 time parameter sets, wherein the N2 time parameter sets are predefined, the N time parameter sets comprise the N1 time parameter sets and the N2 time parameter sets, a sum of N1 and N2 is N, and N1 and N2 are both positive integers.

9. The method according to claim 1, wherein the method further comprises:
receiving second downlink information, wherein the second downlink information is used to indicate the first time; and
determining the first time based on the second downlink information.

10. A communications apparatus, comprising a processor coupled with a memory, wherein the processor is configured to execute instructions stored in the memory, wherein the instructions cause the apparatus to:
determine at least one target time parameter set based on N time parameter sets, wherein N is a positive integer greater than or equal to 2, time unit lengths corresponding to at least two of the N time parameter sets are different, each time parameter set comprises at least one time parameter, and the at least one time parameter is used to indicate a quantity of time units between receiving first downlink information and feeding back first response information corresponding to the first downlink information; and
send a codebook at a first time, wherein the codebook comprises response information corresponding to downlink information received at at least one of M target times, the at least one of M target times are determined based on the first time and the at least one target time parameter set, and M is a positive integer.

11. The apparatus according to claim 10, wherein each of the N time parameter sets corresponds to a downlink control information (DCI) format, and DCI formats corresponding to at least two of the N time parameter sets are different.

12. The apparatus according to claim 11, wherein, to determine the at least one target time parameter set, the instructions, when executed by the processor, cause the apparatus to: determine one of the N time parameter sets as the target time parameter set.

13. The apparatus according to claim 12, wherein, to determine one of the N time parameter sets as the target time parameter set, the instructions, when executed by the processor, cause the apparatus to: use, as the target time parameter set, a time parameter set predefined in the N time parameter sets that corresponds to a time unit length of a predefined value or a predefined DCI format.

14. The apparatus according to claim 11, wherein, to determine the at least one target time parameter set, the instructions, when executed by the processor, cause the apparatus to: use, as the target time parameter set, a time parameter set that is an intersection set or a union set of the N time parameter sets.

15. The apparatus according to claim 11, wherein, to determine the at least one target time parameter set, the instructions, when executed by the processor, cause the apparatus to: obtain an intersection set or a union set of time parameter sets that are in the N time parameter sets and that correspond to a same DCI format, to obtain at least two combined time parameter sets; and use one of the at least two combined time parameter sets as the target time parameter set.

16. The apparatus according to claim 11, wherein, to determine the at least one target time parameter set, the instructions, when executed by the processor, cause the apparatus to: use each of the N time parameter sets as the target time parameter set, to obtain N target time parameter sets; determine a time set corresponding to each target time parameter set based on the first time and each of the N target time parameter sets, to obtain N time sets; and obtain an intersection set or a union set of the N time sets, to obtain the at least one of M target times.

17. The apparatus according to claim 10, wherein the processor is configured to execute further instructions, to cause the apparatus to:
receive first configuration information, wherein the first configuration information is used to indicate the N time parameter sets; and obtain the N time parameter sets based on the first configuration information; or
receive second configuration information, wherein the second configuration information is used to indicate N1 time parameter sets; and obtain the N time parameter sets based on the N1 time parameter sets and N2 time parameter sets, wherein the N2 time parameter sets are predefined, the N time parameter sets comprise the N1 time parameter sets and the N2 time parameter sets, a sum of N1 and N2 is N, and N1 and N2 are both positive integers.

18. The apparatus according to claim 10, wherein the processor is configured to execute further instructions, to cause the apparatus to:
receive second downlink information, wherein the second downlink information is used to indicate the first time; and
determine the first time based on the second downlink information.

19. A communications apparatus, comprising a processor coupled with a memory, wherein the processor is configured to execute instructions stored in the memory, wherein the instructions cause the apparatus to:
receive a codebook at a first time, wherein
the codebook comprises response information corresponding to downlink information received at at least one of M target times, M is a positive integer, the at least one of M target times are determined based on the first time and at least one target time parameter set, the at least one target time parameter set is determined based on N time parameter sets, N is a positive integer greater than or equal to 2, time unit lengths corresponding to at least two of the N time parameter sets are different, each time parameter set comprises at least one time parameter, and the at least one time parameter is used to indicate a quantity of time units between sending first downlink information and receiving first response information corresponding to the first downlink information.

20. The apparatus according to claim 19, wherein the processor is configured to execute further instructions, to cause the apparatus to:
determine the N time parameter sets; and send first configuration information, wherein the first configuration information is used to indicate the N time parameter sets; or determine the N time parameter sets, wherein the N time parameter sets comprise N1 time parameter sets and N2 time parameter sets, the N2 time parameter sets are predefined, a sum of N1 and N2 is N, and N1 and N2 are both positive integers; and send second configuration information, wherein the second configuration information is used to indicate the N1 time parameter sets.

\* \* \* \* \*